United States Patent [19]
Robertson

[11] Patent Number: 4,680,457
[45] Date of Patent: Jul. 14, 1987

[54] CODE READER

[75] Inventor: John A. Robertson, Chillicothe, Ohio

[73] Assignee: Telesis Controls Corporation, Chillicothe, Ohio

[21] Appl. No.: 708,974

[22] Filed: Mar. 7, 1985

[51] Int. Cl.⁴ .............................................. G06K 7/10
[52] U.S. Cl. .................... 235/470; 235/463; 235/471; 235/472
[58] Field of Search ................ 235/463, 470, 471, 472

[56] References Cited
U.S. PATENT DOCUMENTS

| | | | |
|---|---|---|---|
| 3,800,282 | 3/1974 | Acker | 235/470 |
| 4,001,780 | 1/1977 | Kikukawa | 235/470 |
| 4,114,030 | 9/1978 | Nojiri | 235/470 |
| 4,147,295 | 4/1979 | Nojiri | 235/470 |
| 4,535,204 | 8/1985 | Hughes | 235/472 |
| 4,578,570 | 3/1986 | Mazumder | 235/463 |

Primary Examiner—Harold I. Pitts
Attorney, Agent, or Firm—Mueller and Smith

[57] ABSTRACT

A code reader and method which is capable of reading "black-on-black" codes such as bar codes which are molded in the surface of an object. The code is illuminated so as to provide light-to-shadow transitions which are read by an imaging device such as a video camera. The resultant video signal transitions representing light-to-dark transitions are differentiated and converted to a train of pulses which are submitted to a delay line sequencing network to develop a series of timing signals. These timing signals are utilized to operate a sampling network to derive 0-bit and 1-bit code information which is submitted serially to a serial-to-parallel shift register to permit code reading by a microcomputer function. Legality checks are carried out with respect to sampling and the developed work and quiescent zones are developed with respect to the start and stop of a given code sequence.

26 Claims, 15 Drawing Figures

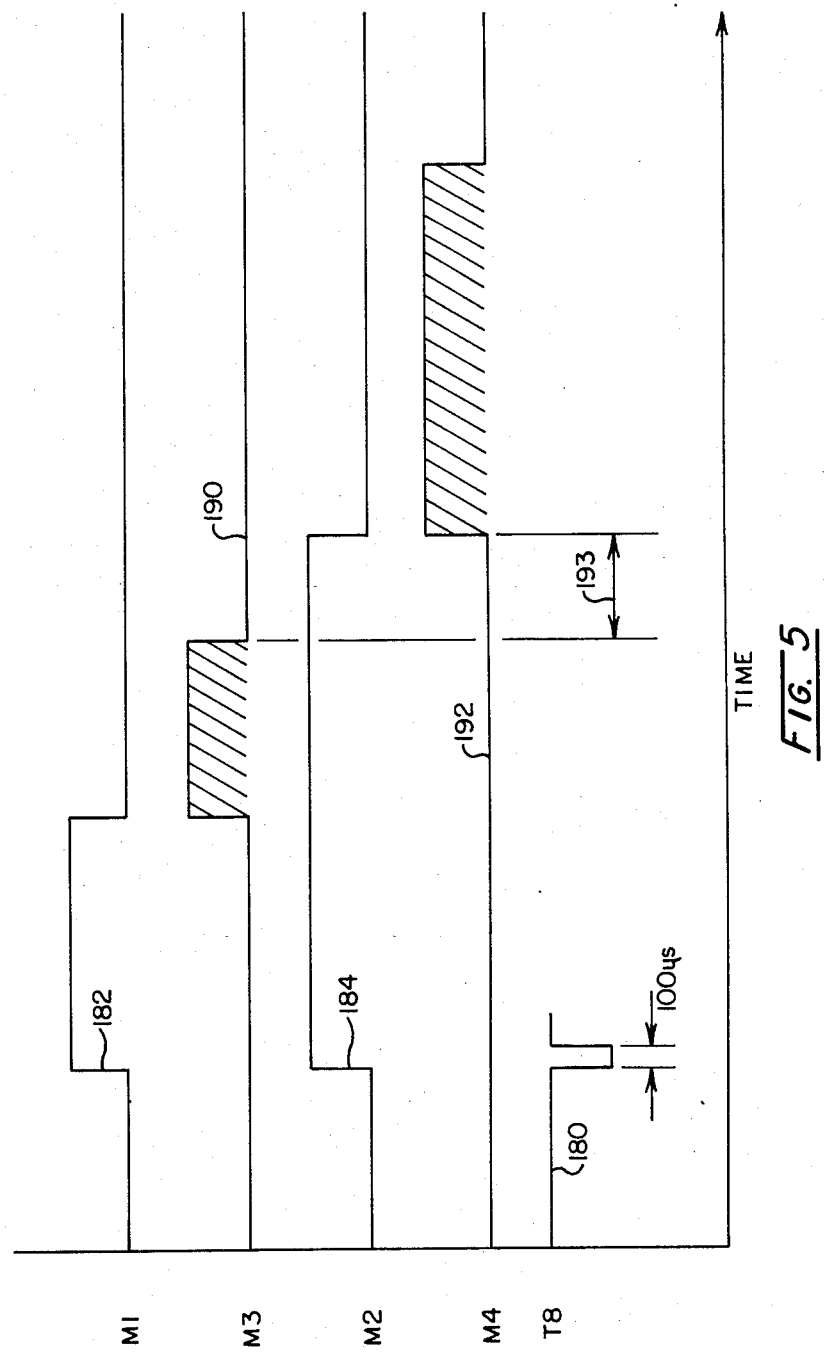

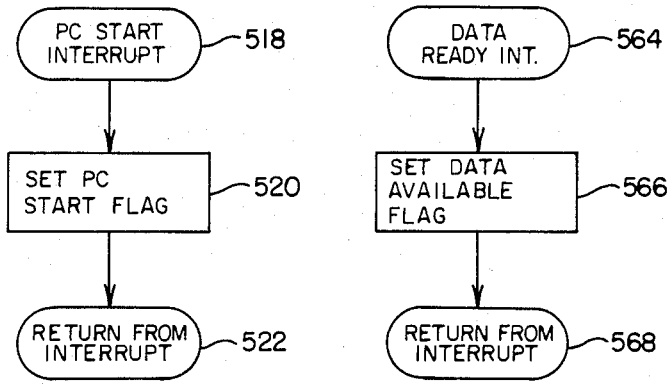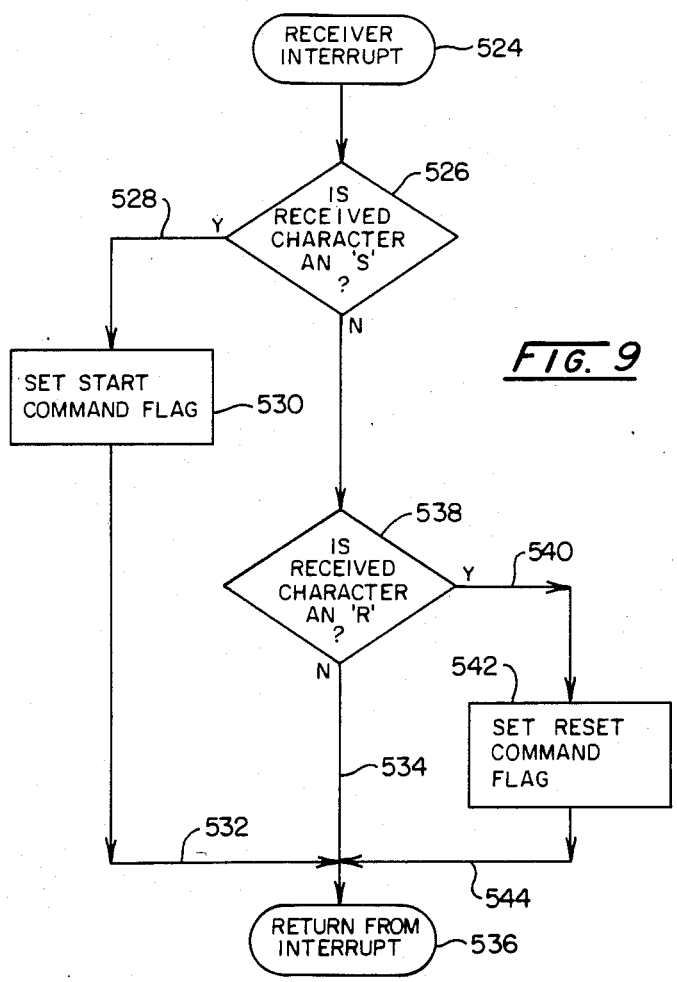

ature, the
CODE READER

BACKGROUND

Bar code production identification systems have exhibited extensive utility in a broad range of industries. Generally, the codes are comprised of sequences of dark lines or bars located over or against a white or highly contrasting background. These bars are of selectively varying thickness and spacing so as to be machine readable and, for the most part, are provided as labels on goods or devices. To achieve a reliability for readability, the bar codes employ the basic principle of establishing a very high contrast between a white background and a black bar or vice versa. In this regard, the specifications for the production of these codes are very rigid, an adequate ratio of reflectance and absorbance in the produced code being required.

The retail trade utilizes the coded systems extensively to facilitate partial automation of the retail store checkout process. As items carrying the bar coded labels are presented to the store clerk or checker, they are passed over an optical scanner which employs laser optics for "reading" the code and transmitting the thus read information to a computer for any of a wide variety of purposes related, e.g. to price, inventory, taxing, special programs, or the like. For effective and reliable operation, the goods carrying the coded labels are manipulated by the operator or checker within the defined optical scanning region of the code detection system until a valid "read" is achieved. Generally, a short audible pulse indicates the reception of a valid read and the rate thus required for this reading procedure is of a slow enough level to permit a real time computer analysis of the code as it is being scrutinized bar by bar.

Industry requirements for product identification now have expanded. For example, it has been found to be desirable to provide bar codes which are formed as part of the product manufacturing process itself. Where bar codes are to be so used, the bar-background contrast ratios necessarily must be greatly weakened. For instance, one industrial field, the tire industry, has identified a need for applying a bar code identification to tires at the time of their molding. This bar code would be a series of bar protrusions extending from the outer surface of the tire itself. Necessarily, there will be no strong visual contrast between the protruded bar components and the background, inasmuch as they are formed from the same black pigmental material and the code structuring which is provided might be considered as "black-on-black". Thus, for any identification system of this type to be practical, a technique for reading this molded bar code of minimal reflectance ratio must be devised.

Where such reading of "black-on-black" codes is achieved, a next development requirement is imposed upon the investigator. Because industrial production procedures generally involve the regulated movement of products along a production route or line, bar code reading must occur at select points along that route. For the reading procedure to be practical, no operator intervention should be required to carry out the act of reading. For example, no operator should be present to manipulate the tire or other product before the scanning optics to search for a valid read signal as is common in connection with retail outlet utilizations of the systems. Thus, a principal difficulty in evolving a practical code reading system is a requirement for identifying with accuracy where the code is located on the product in the first instance. For the case of tire manufacture, the code might exist in any region over a two inch or more diametric region on the tire simply because tires are produced in differing sizes. Yet, to achieve a valid read, the optical scanning system must accurately confront or cross each bar within the entire code. Attempts to carry out such reading with conventional optical scanning devices have been observed to result in unsatisfactory performance.

SUMMARY OF THE INVENTION

The present invention is addressed to apparatus, system, and method for reading bar codes and the like including those which may exhibit very low contrast ratios between background and code components. Codes at the surface of an object are readily located by the system through the utilization of video imaging devices, the output signals from which are scrutinized to carry out reading and validation procedures. Because transitions of the video signal corresponding with code transitions are scrutinized by the system, the rate of propagation of transitions is too great to permit conventional computer analysis of code spacings and the like. To accommodate for these speeds, the signal transitions are differentiated to remove background effects and then converted to a pulse train which is submitted to a sequencing delay network. Through the employment of this delay network, timing signals may be developed which then are used in conjunction with procedures for carrying out code extraction. In the latter regard, sampling networks are provided which time-out the interval representing the spacing of one code transition to the next. Because the ratios for bit definition are known, the arrival of a given pulse at these networks is used to commence the time-out, for example, of a 0-bit and a 1-bit, following which a window or tolerance interval is developed. Should the next succeeding pulse occur during this tolerance interval, then a bit datum is developed which is directed to a serial-to-parallel alignment function which may be provided as a serial-to-parallel shift register. With this arrangement, the resultant code word then can be read and analyzed by a microcomputer. Various checks for legality and the assertion of quiescent periods are provided in conjunction with the manipulation of the video derived data.

The reading system is capable of reading molded bar codes and the like of very low, black-on-black structural through the use of tangential lighting as provided by a strobe illuminator or the like. By positioning the video camera at about 90° to the axis of propagation of illumination from the strobe illumination unit, the light-to-shadow transitions formed by the bar code can be detected and evaluated.

Another feature of the invention provides for apparatus for reading a code provided as a word deriving sequence of radiation definable transitions carried by an object and selectively spaced from first to last in accordance with a predetermined ratio defining first bit and second bit information. The apparatus includes an imaging arrangement for imaging at least a portion of the code carrying object for generating an image output signal having image signal transitions occurring in a time spaced sequence corresponding with the code sequence of spaced transitions. A signal treatment circuit is provided which responds to the imaging device for converting the image signal transitions into a corresponding train of pulses. A sequencer network is provided for receiving the train of pulses which has a sequence of timing stages positioned from first to last for selectively delaying the transmission of the pulses therethrough to establish a sequence of pulse occurrence timing signals commencing with the train of pulses. A first sampling network is provided which is responsive to a given timing signal established by a sampling timing stage positioned subsequent in the sequence of the first stage for deriving a valid first bit condition following a first interval corresponding with the time spaced sequence representing the first bit select spacing and responsive to a next timing signal then are used in conjunction with procedures for carrying out code extraction. In the latter regard, sampling networks are provided which time-out the interval representing the spacing of one code transition to the next. Because the ratios for bit definition are known, the arrival of a given pulse at these networks is used to commence the time-out, for example, of a 0-bit and a 1-bit, following which a window or tolerance interval is developed. Should the next succeeding pulse occur during this tolerance interval, then a bit datum is developed which is directed to a serial-to-parallel alignment function which may be provided as a serial-to-parallel shift register. With this arrangement, the resultant code word then can be read and analyzed by a microcomputer. Various checks for legality and the assertion of quiescent periods are provided in conjunction with the manipulation of the video derived data.

The reading system is capable of reading molded bar codes and the like of very low, black-on-black structure through the use of tangential lighting as provided by a strobe illuminator or the like. By positioning the video camera at about 90° to the axis of propagation of illumination from the strobe illumination unit, the light-to-shadow transitions formed by the bar code can be detected and evaluated.

Another feature of the invention provides for apparatus for reading a code provided as a word deriving sequence of radiation definable transitions carried by an object and selectively spaced from first to last in accordance with a predetermined ratio defining first bit and second bit information. The apparatus includes an imaging arrangement for imaging at least a portion of the code carrying object for generating an image output signal having image signal transitions occurring in a time spaced sequence corresponding with the code sequence of spaced transitions. A signal treatment circuit is provided which responds to the imaging device for converting the image signal transitions into a corresponding train of pulses. A sequencer network is provided for receiving the train of pulses which has a sequence of timing stages positioned from first to last for selectively delaying the transmission of the pulses therethrough to establish a sequence of pulse occurrence timing signals commencing with the train of pulses. A first sampling network is responsive to a given timing signal established by a sampling timing stage positioned subsequent in the sequence from the first stage for deriving a valid first bit condition following a first interval corresponding with the time spaced sequence representing the first bit select spacing and responsive to a next timing signal occurring during the valid first bit condition established at a next pulse timing stage positioned prior to the sequence of those timing stages to the sampling timing stage to provide a first bit datum. A second sampling network is provided which responds simultaneously with the first sampling network to the given timing signal for deriving a valid second bit condition following a second interval corresponding with the time spaced sequence representing the second bit select spacing and is responsive to the next timing signal occurring during the valid second bit condition established by the next pulse timing stage to provide a second bit datum. A serial-to-parallel alignment derived such as a shift register is provided which responds to the first bit datum and second bit datum in the sequence of their occurrence for deriving a parallel output representing the code word and a control is provided which is responsive to the parallel output for carrying out decoding procedures.

A further feature of the invention resides in a system for reading a code at the surface of an object provided as a word deriving sequence of three-dimensional code components selectively spaced from first to last in a spacing ratio defining first bit and second bit information. The system includes a radiation source for exposing the surface to radiation from a location which derives radiation definable transitions at the code components. An imaging device then serves to image the surface to generate a video-type output signal having transitions occurring in a time spaced sequence corresponding with the code component spacing. A signal treatment circuit is provided which responds to the imaging means of differentiating the transitions thereof and converting the differentiated transitions to a corresponding train of pulses. A sequencing network is provided for receiving the train of pulses and which has a sequence of timing stages from first to last for selectively delaying the transmission of the pulses therethrough to establish a sequence of pulse occurrence timing signals. A sampling circuit is provided which includes a first sampling network having a first transition interval timing stage which responds to a given timing signal corresponding with a sampling timing stage positioned subsequent in the sequence thereof from the first stage and which provides a first output following an interval corresponding with a time spaced sequence representing a first bit select spacing. A first tolerance interval timing stage then is provided which is responsive to the first output for deriving a valid first bit condition for a predetermined first tolerance interval and a first latch is provided which responds to the next timing signal occurring during a valid first bit condition corresponding with a next pulse timing stage position located prior in the sequence to the sampling timing stage to provide a first bit datum. A second sampling network is provided having a second transition interval timing stage which is responsive to the given timing signal for providing a second output following an interval corresponding with the time spaced sequence representing a second bit select spacing. A second tolerance interval timing stage is included which is responsive to the second output for deriving a valid second bit condition for a predetermined second tolerance interval and a second latch is incorporated with the network which is responsive to the next timing signal occurring during the second valid bit condition to provide a second bit datum. A serial-to-parallel alignment device is incorporated which responds to each first bit datum and second bit datum in the sequence of their occurrence for deriving a parallel output representing a word and a control is incorporated which responds to treat the parallel output.

As still another feature, the invention provides a method for reading a code at the surface of an object provided as a word deriving sequence of radiation definable transitions selectively spaced in accordance with a predetermined ratio defining first bit and second bit information, which comprises the steps of: Imaging the surface with a video device to generate an output signal having transitions occurring in a time spaced sequence corresponding with the code sequence of spaced transitions. Forming a train of pulses from the output signal. Applying the train of pulses to a sequence of timing stages from first to a sampling stage to establish a sequence of pulse occurrence timing signals. Applying a given timing signal associated with the sampling stage to a first sampling network having a valid first bit condition during a first tolerance interval following a first interval corresponding with a time spaced sequence representing the first bit select spacing. Simultaneously, applying the given timing signal to a second sampling network having a valid second bit condition during a second tolerance interval following a second interval corresponding with a time spaced sequence representing second bit spacing. Deriving a first datum when the next pulse of the train of pulses following the given timing signal occurs during the first tolerance interval. Deriving a second bit datum when the next pulse occurs during the second tolerance interval. Arranging each derived first bit datum and second bit datum serially in the sequence of their occurrence to develop a word and reading the word.

Other features of the invention will, in part, be obvious and will, in part, appear hereinafter. The invention, accordingly, comprises the apparatus, system, and method possessing the construction, combination of elements, arrangement of parts and steps which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIG. 5 is a timing diagram illustrating the operation of certain components of FIG. 4;

FIG. 8 is a flow chart of a PC start interrupt routine;

FIG. 9 is a flow chart for a receiver interrupt routine;

FIG. 10 is a flow chart for a data ready interrupt routine;

DETAILED DESCRIPTION OF THE INVENTION

Integrally molded bar codes are located and read in accordance with the present invention through the use of a video camera or the like. The product or object carrying the code is illuminated from a light source located to project light at a relatively shallow angle of incidence such that the illumination directed from this position creates transitions from light to shadow at the leading or trailing edges of the protruding bars which define the code. It will become apparent that a broad range of codes can be read with the instant system, i.e. printed, indented, protruding, multicolor, and the like. The camera, which is a video camera or the like, has the capability of imaging a significant portion of the object carrying the code and serves to generate an image typically providing a raster having a width of 400 pixels and a height of 260 pixels, i.e. the frame of a standard television image. That entire image is analyzed line-by-line to locate a valid code. The code is then analyzed for legality and decoded. Because every line width of the raster is analyzed, the code can be located even though its position varies and a plurality of readings of the transitions represented by light-to-shadow will be generated for the code to develop a desirable reading redundancy. Because this scanning occurs at video rates, the system must operate in conjunction with a data-string occurring at a rate of about 4 MHz and, thus, the typical techniques of analyzing bar codes utilizing the computational power of computers with respect to each bar cannot be resorted to. In effect, the extracted signal is the equivalent of a data rate of about 2 million baud.

Figure 1:
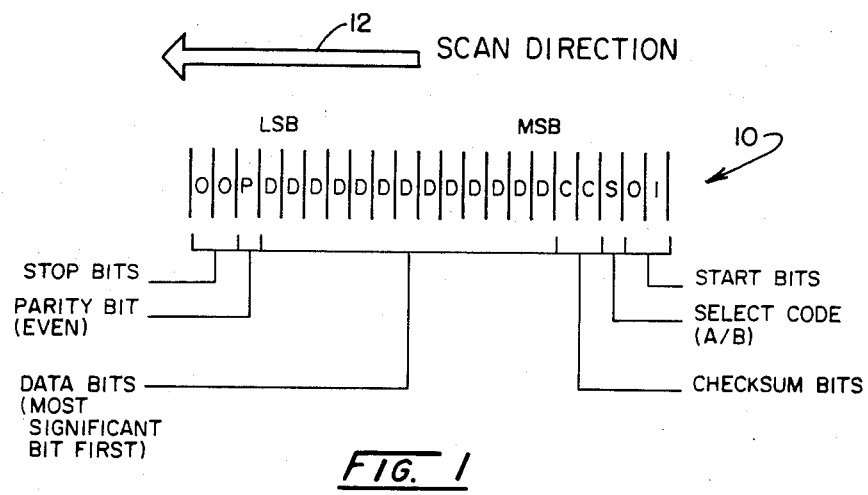
FIG. 1 is a diagrammatic representation of an exemplary bar code.

The technique of the invention can be used with a broad number of code designs, depending upon the desires of the user. The codes preferably are binary and the distinction between a binary 1 value and a binary 0 value for the embodiment described resides in the distance between the edges of adjacent ones of these bars. In this regard, a unit spacing between edges, which are seen as transitions in the resultant video signal, is designated to represent a binary "0". Correspondingly, a doubling of that spacing, or two units between adjacent or sequential light-shadow transitions is designated to represent a binary "1". Thus, while the widths of molded code bars are not particularly critical, the spacing between bar edges is important to establishing the code. Referring to FIG. 1, a representation of the components of an exemplary code is schematically revealed. The figure does not show edge spacing but is provided to demonstrate the functional assignment of the bits comprising the code. Shown generally at 10, the code is of 21-bit extent comprised of 22 bars which are molded into the product to be identified and which serve to define 21 spaces. Code 10 is scanned in the direction shown by arrow 12 to provide an input to the reader system which commences with the start bits 1, 0 as labelled, following which a code select bit and checksum bits are provided. Following these entry bracketing bits, the code provides binary data, commencing, for example, with the most significant bits (MSB) and leading then to the least significant bit (LSB). Note that these data bits are labelled "D". The data presentation then is followed by a parity bit, labelled "P" following which, an indication that the code has ended may be provided by two bits labelled "Stop Bits".

Where such codes as are represented at 10 are employed, for example, in the manufacture of rubber tires, they may be molded in the outer convexly shaped casing and, as part of the production process, the tires will individually be maneuvered to a reading station where they can be rotated before a video imaging device.

Figure 2:
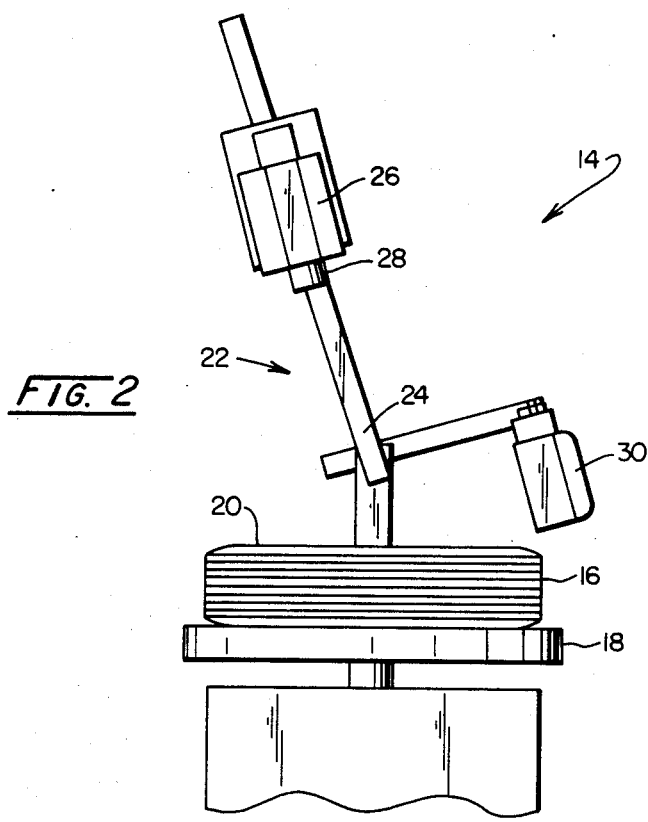
FIG. 2 is a pictorial representation of an object being scrutinized by the imaging and illuminating components of the system of the invention.

Looking to FIG. 2, such an arrangement is depicted generally at 14, a tire 16 being supported upon a rotatable platform or carousel 18. With this positioning, one convexly contoured sidewall 20 of the tire 16 is outwardly disposed to present the black-on-black integrally molded bar code therein to an imaging assembly 22. Assembly 22 includes a multi-component adjustable support rig 24 which supports a camera 26 having adjustable entrance optics 28 positioned above sidewall surface 20 such that the entrance optics 28 may image one entire portion of the tire extending from the tread to the inner rim. By adjusting the position of camera 26, as well as by manipulating its entrance optics, varying select degrees of magnification and the like are achieved in conventional fashion, (aperture or lens alterations) and may be selected to optimize code reading. The rig 24 also supports a source of radiation or illumination, preferably a strobe light as represented at 30. Note that the strobe illuminator 30 is arranged such that the axis of propagation of illumination directed to the surface 20 is at a very shallow angle with respect thereto, for example about 20° from the tire side surface to develop optimal shadows. Additionally, it may be noted that the axis of the entrance optics of camera 26 substantially is at a right angle with respect to the direction of illumination emanating from the light source 30. This has been found to achieve a desirable development of light to shadow (dark) transitions with respect to the edges of the molded bars of the code, giving optimal spectral reflectance. The reading procedure is carried out by rotating the carousel 18 such that the tire wall surface 20 is rotationally maneuvered before the field of view of the entrance optics 28 of camera 26. Preferably, the strobe illumination unit 30 is actuated at the frame rate of camera 26 and in synchronization therewith such that variations due to interlacing are avoided and sequential substantially repeating frame images are presented to the reader system. Other forms of illumination, however, may be utilized, the criteria being to achieve a light-to-dark transition for each bar edge.

The output of camera 26 will be an analog video signal or imaged output signal containing image information which then is treated such that the bar code is extracted, verified, and decoded. Such an analog video signal may be a composite video one, for example the NTSC signal utilized in the United States, containing horizontal and vertical synchronization signals, or it may be comprised of video information alone or its equivalent. Because analog circuitry is utilized to accommodate the very high speeds with which this information is developed, practial limits may be assumed with respect to the magnitude of the input video voltage. For example, the peak-to-peak voltage representing transitions may be limiting with the range: $0.1 < V_{p-p} < 10$. Because the video signal must represent a transition of light-to-dark information in the image with some minimum rate of change of video voltage, the next additional expression should be considered for the system: $|d(v_{edge})/dt| > 0.5$ V/NS. Synchronizing signals which may be present in the scanned output signals will be ignored by the system as mere noise.

Figure 3:
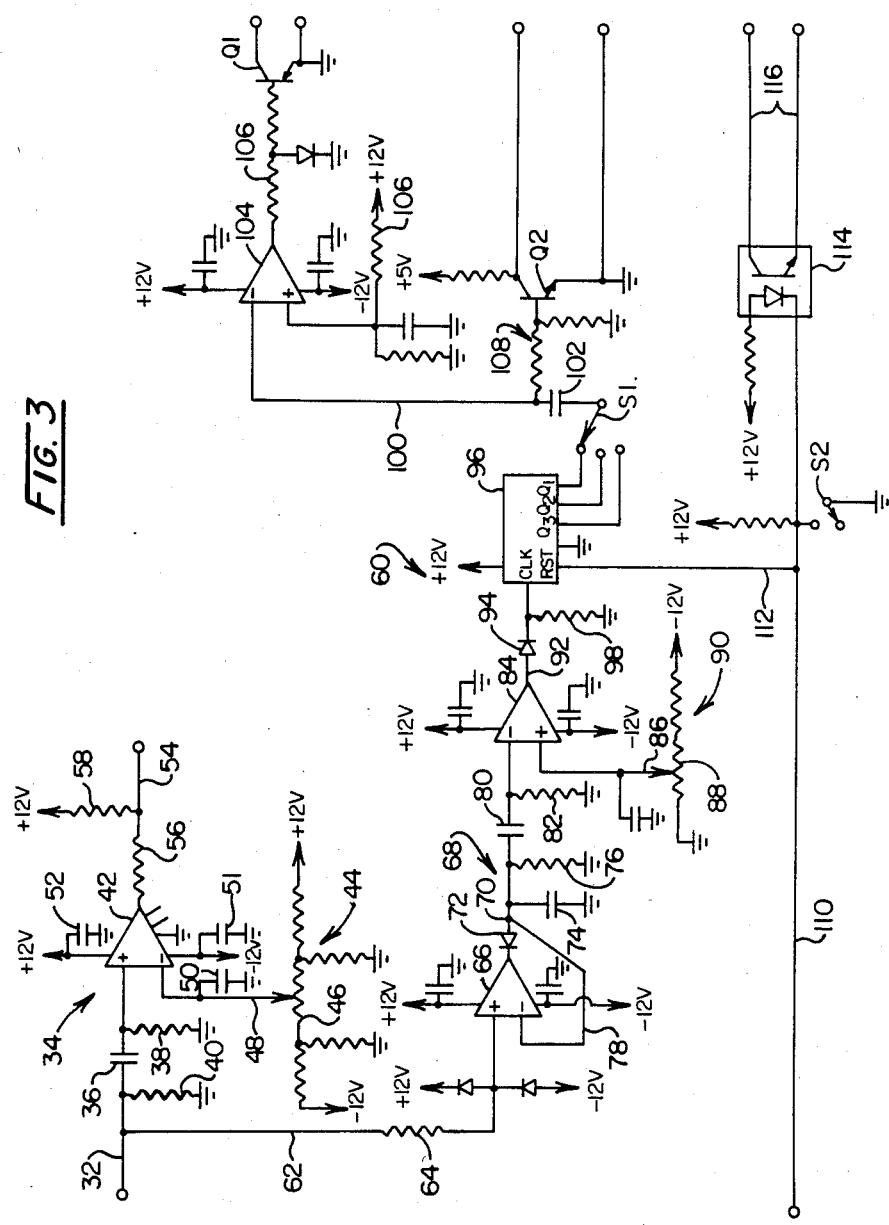
FIG. 3 is an electrical schematic diagram of the signal treatment components of the invention.

The procedure for carrying out an extraction of the code contained in the video signal emanating from camera 26 initially involves a signal treatment wherein the rapid, light-to-dark image signal transitions within the video signal are detected and digital logic pulses are generated in conjunction with each such transition. Referring to FIG. 3, the initial ones of these signal treatment stages are revealed. The video signal train carrying serially developed components corresponding with the code sequence of spaced transitions are conveyed in conventional fashion, for example via a coaxial cable, to input line 32. Line 32 leads to a differentiation network 34 which is, in effect, a passive, high-pass filter formed of capacitor 36 within line 32 and resistor 38 coupled between line 32 and ground. A resistor 40 is provided to terminate the coaxial input cable and thereby reduce noise and reflections of the signal. This differentiation procedure functions to immediately resolve any background effects by looking only to the rate of change represented by a light-to-dark transition.

Each thus differentiated signal is directed to the positive input of a high-speed voltage comparator 42 which, for example, may be provided as a type LM306 marketed by National SemiConductor, Inc. The negative terminal input of comparator 42 receives a reference signal provided as a negative level for a divider network represented generally at 44 which includes a potentiometer 46, the wiper arm of which is constituted as line 48 leading to the noted input to comparator 42. Comparator 42 is shown connected to +12 V and −12 V supplies as well as to ground and performs in conjunction with capacitors as at 50–52 which serve to provide a by-pass filter function to minimize noise. The output of comparator 42 at line 54 is directed through a resistor 56 which functions to minimize ringing effects and this output further is associated with pull-up resistor 58 coupled to +5 V supply.

As described in conjunction with FIG. 2, it is desirable to actuate the strobe illuminator 30 in synchronism with the generation of each frame. For providing optional techniques to achieve such actuation, a vertical sync separation network is provided as represented generally at 60. To detect the vertical sync signal, the video signal at line 32 is additionally directed through line 62 and resistor 64 to the positive input of the operational amplifier component 66 of a negative peak detector network 68. In this regard, the output line 70 of the amplifier 66 includes diode 72, capacitor 74, resistor 76 and a feedback line 78. With the arrangement, the negative-going voltage level at capacitor 74 is drawn down to an ascertainable level by the longer vertical retrace signal. Conversely, capacitor 74 will charge toward ground in conjunction with resistor 76 when reacting to the shorter horizontal sync pulse. The resultant lower signal representing a vertical synchronization pulse is directed through differentiating capacitor 80 and resistor 82 combination to be introduced to the negative input terminal of a comparison function carried out by an operational amplification stage 84. In this regard, the opposite or positive input to amplifier stage 84 is provided from line 86 which is directed to the wiper of a potentiometer 88 within reference network 90. When the threshold set by network 90 is exceeded, a positive signal is provided at output line 92 which is directed through a protective diode 94 to the clock input of a ripple-carry binary counter 96. A resistor 98 is coupled between line 92 and ground. This counter, in the present embodiment, serves to divide by 2 at its $Q_1$ output which is tapped by switch S1. Thus, a field rate drive for the illumination function may be provided. Line 100 extends from a drive selection switch S1 and includes a coupling capacitor 102. For example, a strobe drive may be provided by PNP transistor Q1 which is drawn into conduction by virtue of the assertion of the signal at line 100 to the negative input terminal of operational amplifier 104, the output of which is coupled through resistor network 106 to the base of the transistor. The positive input to amplifier 104 is shown coupled to a voltage reference network 106. In similar fashion, an NPN transistor Q2 may be employed to provide a TTL output function, its base being coupled through resistor network 108 to line 100.

As an alternate arrangement for firing the strobe device 26, an enabling input from the microprocessor based control of the apparatus may be provided from line 110 or may be derived from a 60 Hz line power input to the system. This signal at line 110 is directed to the reset terminal of counter 96 through line 112 and is directed to the LED component of an optocoupler 114 for providing isolated actuation of the strobescope unit through lines 116. Component 14 may, for example, be present as a phototransistor optoisolator type 4N36 marketed by Monsanto Corp. and serves to accommodate for the inherently noisy characteristic of operation of strobescopic devices. Switch S2 functions as a maintenance component for turning on the illumination component at the will of the operator.

Figure 4:
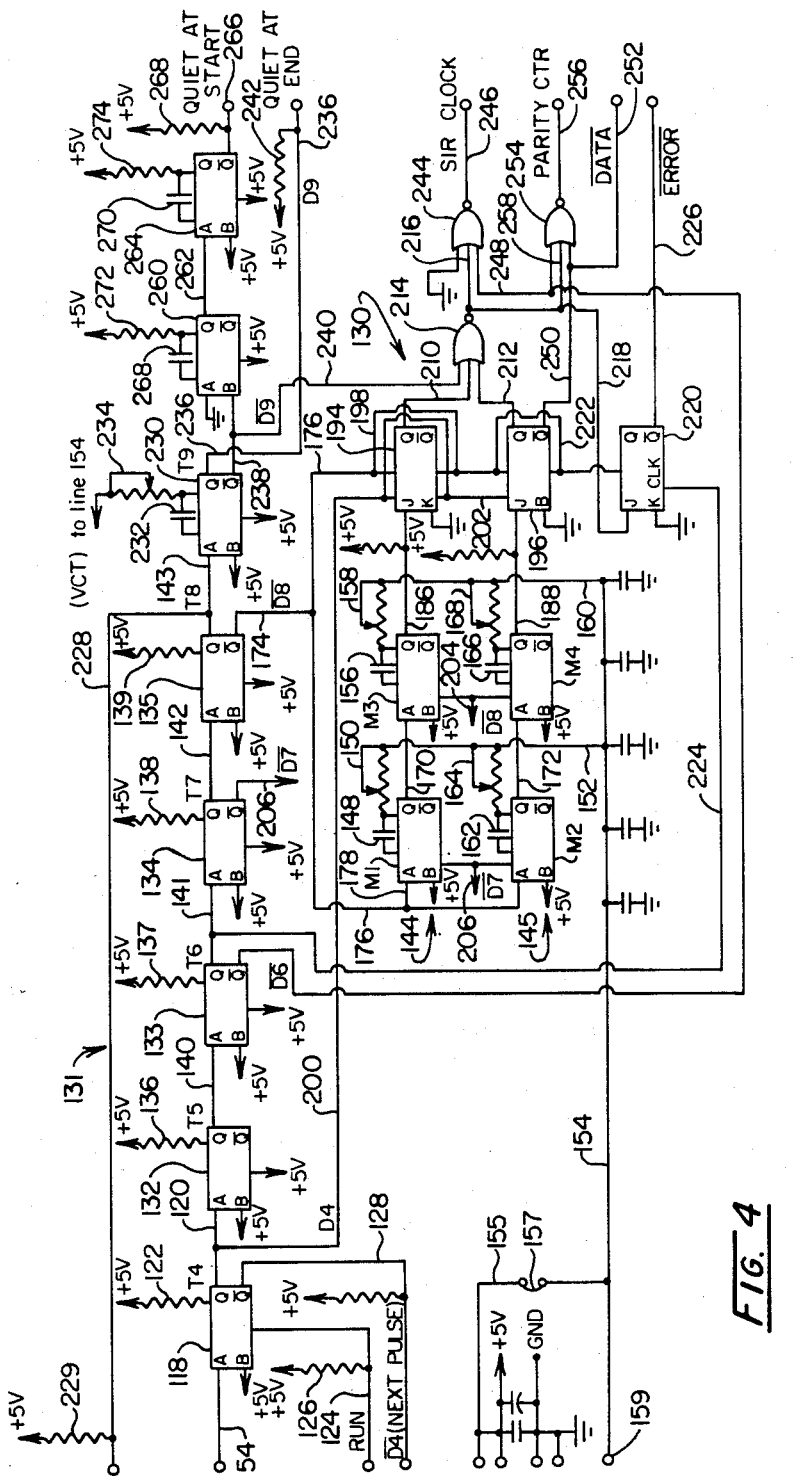
FIG. 4 is an electrical schematic diagram of the sequencing and sampling networks of the invention.

Returning to the differentiated transition responsive train of pulses derived at line 54, each pulse is treated by a pulse shaping stage present as a dual retriggerable monostable multivibrator shown in FIG. 4 at 118. Multivibrator 118 serves to receive the differentiated signal train input at line 54 at its A input and provide a pulse of about 100 nanosecond (ns) pulse width at its output line 120 for each asserted differentiated edge. Present, for example, as a type 74LS123 marketed by Signetics Corp. the 100 nanosecond time-out of the device is derived by selection of the value of resistance at resistor 122, the latter being coupled between the device and +5 V. Multivibrator 118 is enabled from a control circuit via line 124 carrying the signal designation "RUN", which line also includes a pull-up resistor 126 coupled to +5 V. The signal at line 124 will be seen to be the inverse of the strobe enabling signal described in conjunction with FIG. 3 at line 110.

For purposes of facilitating the discourse to follow, the Q output for multi-vibrator 118 at line 120 is arbitrarily designated as a timing signal occurring at time "T4" and designated "NEXT PULSE". Similarly, the inverse of that pulse output at $\overline{Q}$ output line 128 is designated as occurring at time "$\overline{D4}$".

As is apparent, a string of pulses will be developed at line 120 which occur at a quite rapid rate and the interval spacing between which represents information which may or may not correspond with a valid or true reading of the bar code under scrutiny. In consequence of the great rapidity with which the pulses occur at line 120, that same pulse train is called upon to develop a synchronization scheme by which sequencing control may be asserted over a code extraction or sampler circuit represented generally at 130. This sequencing scheme is implemented by a multi-stage sequencer or digital delay line represented generally at 131 and comprised of four monostable multi-vibrator components 132–135. Multi-vibrators 132–135 are identical, being, for example, the earlier-described type 74LS123 and each of the group, as before, is arranged to provide a 100 nanosecond pulse timed output at it Q terminal in consequence of the coupling to its timing control input of a resistor of respective 136–139. Note that these resistors, in turn, are coupled with +5 V supply. In consequence of this delay line arrangement, the pulses of the pulse train asserted at line 120 ripple through monostable multivibrators 132–135 and are affected by the uniformly asserted 100 ns delay to develop four timing signals at respective lines 140–143 which are provided in combination with the "T4" timing signal at line 120. Lines 140–143 also are labelled having the respective timing designations "T5"–"T8".

Operating in timed synchronism with the developed timing control outputs T4–T8 of network 131, the bit discriminator or sampler network 130 functions to determine whether the interval of occurrence between adjacent pulses of the incoming pulse train correspond with valid bit spacings. These valid bit spacings will correspond with that time which is known to occur between the edge spacings of a valid 1 bit or a valid 0 bit. A timing interval representing a 1 bit will be substantially twice the interval length of a spacing representing a 0 bit. To identify this time defined spacing, network 130 incorporates two selectively timed sampling subnetworks of monostable multivibrator-latch combinations which carry out a discrimination process for determining the presence of a 0 bit and a 1 bit which are depicted, respectively, at 144 and 145. Zero bit subnetwork 144 includes serially connected monostable multivibrators M1 and M3, while subnetwork 145 includes serially coupled monostable multivibrators M2 and M4. Multivibrators M1–M4 may be provided as the earlier-described type 74LS123 and serve as timing stages to provide a select time-out following the receipt of an input pulse at their A input terminals. In this regard, the time-out of transition interval timing stage multivibrator M1 is defined by the value of capacitor 148 and setting of potentiometer 150. The latter component is coupled via line 152 to the voltage control timing source line 154. This voltage controlled timing line may be selectively connected to the +5 V source line 155 using the jumper 157; or it may be controlled by external circuitry which would select the desired bits spacing by applying a control voltage input 159 termed "VCT". In similar fashion, the timing characteristic of tolerance interval timing stage multivibrator M3 is adjustably controlled by selection of the value of capacitor 156 and setting of potentiometer 158. The latter component is coupled to the timing control line 154 through line 160.

Similarly, transition interval timing stage multivibrator M2 of subnetwork 145 provides a time-out selected by the value of capacitor 162 and adjustment of potentiometer 164 and the timing characteristic of tolerance interval timing stage multivibrator M4 is derived by electing the capacitance value of capacitor 166 and adjustment of potentiometer 168. As before, component 164 is coupled with the timing control line 154 through line 152 and component 168 is coupled with +5 V through line 160.

In order to determine the timing between successive pulses which may or may not respect bar code transitions, the pulse train is simultaneously introduced to multivibrators M1 and M2 from timing signal position T8. Multivibrator M1 is arranged having a time-out interval corresponding with the successive pulse spacing representing a 0 bit, for example, about one microsecond. This interval is further adjusted for the delays generated in conjunction with network 131 as the given pulse which is introduced is propagated from timing signal location T4 to location T8. In similar fashion, multivibrator M2 is provided a time-out interval corresponding with the spacing between pulses representing a logic 1 bit, for example, about 2 microseconds. At the termination of these time-out periods, a logic high will occur at the Q outputs of multivibrators M1 and M2 to establish valid bit conditions. These outputs of multivibrators M1 and M2 are coupled, respectively, along lines 170 and 172 to the corresponding A terminal inputs of respective multivibrators M3 and M4. The latter devices establish a "window" in time or tolerance interval which is selected to represent a desired tolerance or variation in the timing for given pulse interval spacing. In this regard, for example, multivibrator M3 may have a time-out of about 0.5 microseconds, while multivibrator M4 may be provided having a time-out interval of about 1.6 microseconds.

The simultaneous initial input representing any given commencement of this timing procedure occurs in conjunction with the arrival of a pulse at time T8 as developed from multivibrator 135. Note that time signal T8 is conveyed along line 228 which additionally is coupled through pull-up resistor 229 to +5 V for use by the control function of the system. The actual timing signal employed is the inverted form of signal T8 and is designated $\overline{D8}$ which is seen to emanate from the $\overline{Q}$ output of multivibrator 135 at line 174. Line 174 extends in conjunction with line 176 to the A input terminal of multivibrator M2 and additionally in conjunction with line 178 to the corresponding input terminal of multivibrator M1. The selection of this timing position to initiate the time-out of the multivibrators M1–M4 represents one aspect of a "feed forward" arrangement necessitated by the very high rates of pulse propagation involved. Because of the utilization of timing singnal T8 or $\overline{D8}$ for the initiation of sequential timing, the time-out intervals designed for multivibrators M1 and M2 are arranged such that the constant 400 nanosecond delay of the sequencing network 131 is subtracted from the valid 1 bit and 0 bit time intervals.

Looking additionally to FIG. 5, the pulse occurring at line 174 or at timing signal $\overline{D8}$ is represented at time line 180. The corresponding initiation of time-out with respect to multivibrators M1 and M2 are shown respectively at time lines 182 and 184. Note that the timing logic high interval for time line 184, representing a logic 1-bit, is about twice the corresponding interval for the time-out at time line 182. At the termination of these time-outs, then the window or tolerance intervals defined by multivibrators M3 and M4 commence and, during these intervals, the outputs thereof shown, respectively, at lines 186 and 188 assume a logic high value. This logic high value is represented in FIG. 5 at time line 190 with respect to multivibrator M3 and at time line 192 with respect to multivibrator M4. Thus, should a NEXT PULSE occur at T4 line 200 during the time interval represented by the logic high of time line 190, then a valid 0-bit will have occurred. Correspondingly, should such NEXT PULSE at T4 line 200 occur during the logic high of multivibrator M4 as represented at time line 192, then a valid 1-bit will have occurred. Should the next succeeding pulse occur outside the window of validity represented by the logic highs at curves 190 and 192, then such bit is "illegal". Note in this regard, that the dead band interval 193 intermediate the logic high outputs of multivibrators M3 and M4 also represents an illegal bit.

To detect the presence of a pulse within the windows of acceptance as defined by multivibrators M3 and M4, latching functions as at 194 and 196 are utilized. These latches, which may, for example, be present as JK flip-flops of type 7473 marketed by Signetics Corporation, are arranged such that their J terminals are coupled, respectively, with input lines 186 and 188. These latches are cleared at time T8 by virtue of their connection with the $\overline{Q}$ output of multivibrator 135 through lines 174, 176, and line 198. The occurrence of the next succeeding pulse with respect to the window created by multivibrators M3 and M4 is provided at time T4 of network 131 at line 120. In this regard, line 120 is coupled through line 200 carrying the signal designation "D4" (same as T4) to the clock input of latch 194 and, additionally through line 202 to the corresponding clock input of latching function 196. The timing subnetworks 134 and 135 operating lines 142 and 174 also involve the clearing of multivibrators M1–M4. In this regard, multivibrators M3 and M4 are cleared on the occurrence of earlier-noted timing signal $\overline{D8}$ or at time T8 as represented at line and arrow 204. Multivibrators M1 and M2 are cleared just before that interval on the occurrence of time signal T7 or, as labelled $\overline{D7}$ at line 206 extending from the $\overline{Q}$ output of multivibrator 134 and shown by the arrow in conjunction with the latter multivibrator symbols M1 and M2.

The presence of a next succeeding pulse defining a valid 1- or 0-bit will set the appropriate one of latches 194 and 196 and, in turn, provide a logic high value at their Q output lines shown, respectively, at 210 and 212. These lines extend to the input of an OR function represented at gate 214 which, in turn, provides an output signal at line 216 which is designated $\overline{LEGAL}$ in the presence of a valid or legal bit identification represented as a logic low. This same logic value, additionally, is transmitted via line 218 to the J terminal input of an error detect latch 220. Provided, as above, as a type 7473 JK flip-flop, the latching function 220 is cleared on the occurrence of time signal T8 via line combination 222, 198, 176, and 174. Additionally, the latch 220 is clocked at time signal T6 from multivibrator 133 via lines 141 and 224. Note that time signal T6 occurs after time signal T4, thus the latch 220 will be clocked after the clocking of latches 196 and 196 and the development of a logic high or logic low representing an illegal or legal bit signal at line 218. In the presence of a logic high at line 218 and the clock input from line 224, latching function 220 will provide a logic low signal at output line 226 representing the error signal, $\overline{ERROR}$. With the pulse sampling arrangement thus far described, the initial pulse of any sequence will be identified as an error at line 226, inasmuch as neither latch 194 nor latch 196 will be set when the pulse arrives.

Thus, at the commencement of reading any valid bar code, a special logic case must exist to identify the first pulse or transition of the bar code pattern. To recognize this first pulse, a sequence monitoring stage provided as a monostable multivibrator 230 which may be present as the earlier-described type 74LS123 is employed. The A terminal of multivibrator 230 is coupled with line 143 to receive the pulses occurring at time T8. Additionally, the multivibrator is arranged such that its time-out interval, as defined by capacitor 232 and the adjustment of potentiometer 234 is of relatively lengthy duration with respect to the multivibrators of network 131. For example, the interval may be selected as about 5 microseconds. Because the time constant provided at multivibrator 230 corresponds with several bar code transitions, the rapid occurrence of pulses during a bar code reading at time signal T8 will continually retrigger it such that its output at line 236 identified as signal T9 or D9 will remain continuously at a high logic level. However, at start-up, the device 230 will not have been triggered such that the signal at line 236 is a logic low. The corresponding inverted output, $\overline{D9}$ at lines 238 and 240 will exhibit a logic high level to establish a legal code status, $\overline{LEGAL}$ at output line 216 of OR gate function 214. Of course, the signal at line 240 will revert to a logic low during the retriggering of multivibrator 230 in conjunction with a sequence of bar code transition pulses being asserted thereto. Note that line 236 carrying signal D9 is coupled through a pull-up resistor 242 to +5 V.

The legal or valid bit identifications are directed along line 216 to an inverted input AND function represented at gate 244, the output of which is provided at line 246, upon the occurence of a clocking input from line 248. Note that this clocking pulse occurs at time signal T6 and is represented by the inverted time signal $\overline{D6}$ emanating from the $\overline{Q}$ output of multivibrator 133. Line 246 will be seen to provide a clocking input to a shift register which is arranged to receive the pulse transitions representing a valid bar code and provide a serial-to-parallel bit aligment. Data input to that same shift register is derived from the 1-bit subnetwork 145 via the $\overline{Q}$ output of latching function 196 at line 250 and 252. The signal at line 252 is identified $\overline{DATA}$ i.e. a logic low true. With the arrangement of thus clocking the 1-bits into the shift register, it may be observed that the earlier-described initial bit of a code sequence will always be a 0.

Line 250 from latch 196 also is shown directed to the input of an inverted input AND function represented at gate 254. Having an output labelled PARITY CTR at line 256, the gate 254 is clocked from line 248 at time signal T6 from the inverted version thereof timing signal $\overline{D6}$ and is enabled by the presence of a $\overline{LEGAL}$ signal from lines 218 and 258. Thus, a parity check may be provided as a count of the number of legal 1-bits utilizing a hardware implementation which preferably will be seen to be provided as a modulo-2 count approach. With such an arrangement, a requisite even number of "1s" may be checked.

The output of retriggerable multivibrator 230 at line 236 carrying signal D9 also will be seen to serve the sequence monitoring function of identifying an error condition wherein pulses within a train thereof are missing. The signal at line 236 will transition to a logic low upon the time-out of the multivibrator 230 occasioned by a disappearance of the pulse train for a 5 microsecond interval. This same time-out will occur at the termination of a valid bar code reading and provides a quiescent period following that reading which is desirable to permit the system to carry out resetting. Thus, on the occurrence of a missing pulse phenomena or upon the occurrence of the end of a reading of a bar code, a 5 microsecond interval identified as "QUIET AT END" is derived at line 236.

It also is desirable to assure a quiescent zone or interval prior to the commencement of any bar code reading to assure that the circuitry is in a properly-initialized condition. This zone is developed by a next timing stage.

A transition at the output of retriggerable multivibrator 230 at time T9 represents a condition wherein the system will commence a new reading procedure. Thus, the transition at line 238 from a logic low to a logic high at the time-out of multi-vibrator 230 is detected at the B terminal input of a monostable multivibrator 260. Multivibrator 260 is coupled via line 262 to the A input terminal of another monostable multivibrator 264, the $\overline{Q}$ output of which at line 266 is coupled through pull-up resistor 268 to +5 v. Each of the multivibrators 260 and 264 may be of the earlier-described type 74LS123 and are arranged by selection of values for capacitors 268 and 270 and resistors 272 and 274 to provide a delay with respect to each device, for example of about 600 nanoseconds. Accordingly, the signal at line 266 is a logic true low and represents a 1200 nanosecond delay from the transition at time T9 and is utilized as the signal "QUIET AT START".

The information thus developed from the circuitry of FIG. 4 will include the noted quiescent period definitions as developed in conjunction with the signals at lines 236 and 266 a shift register clocking input at line 246, a parity counter clocking output at line 256, $\overline{DATA}$ at line 252, $\overline{ERROR}$ at line 226, $\overline{D4}$ at line 128 and the signal representing the occurrence of a pulse at T8 which is conveyed from line 143 via line 228.

Figure 6A:
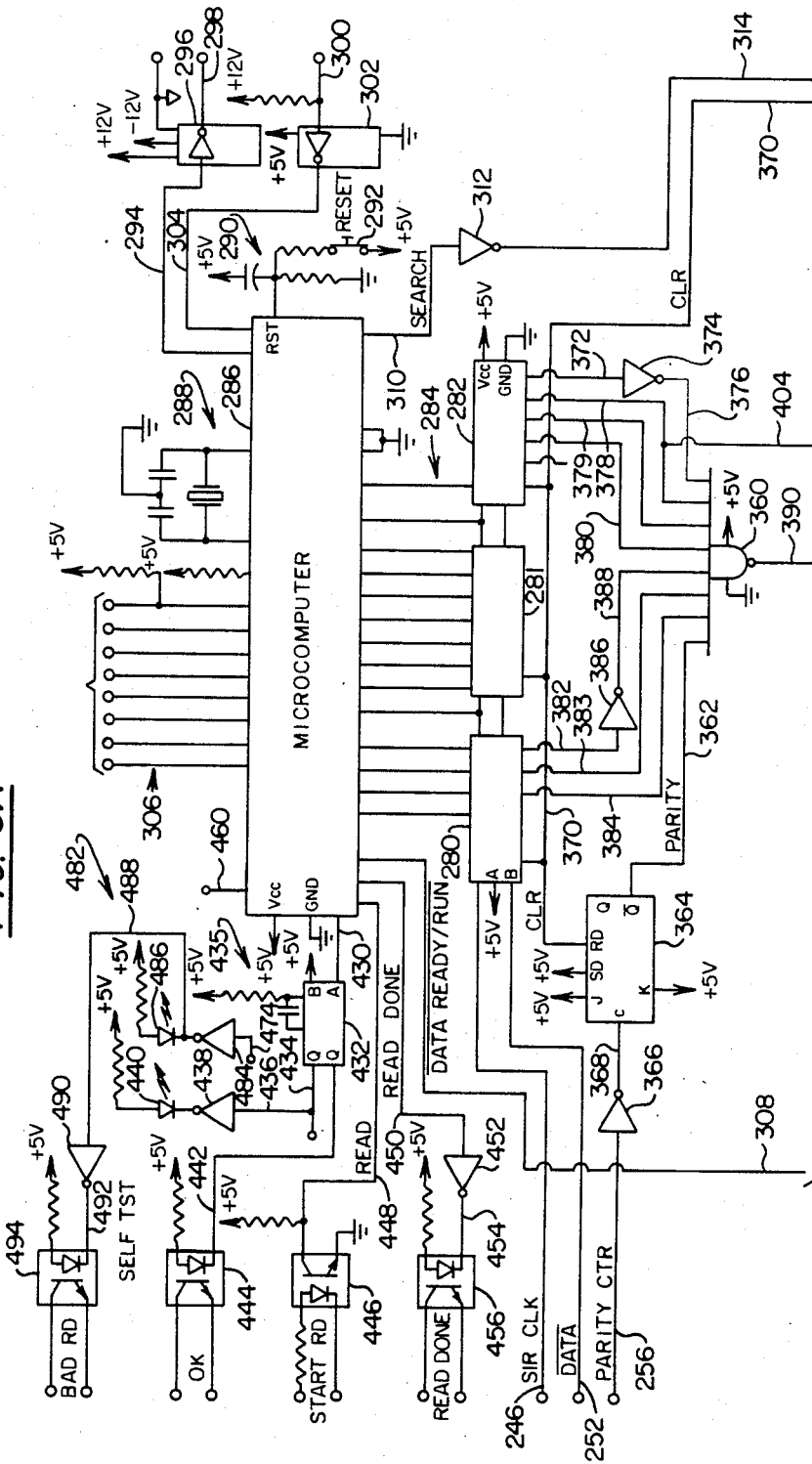
FIGS. 6A and 6B combine to provide an electrical schematic diagram of the control circuit components of the invention.
Figure 6B:
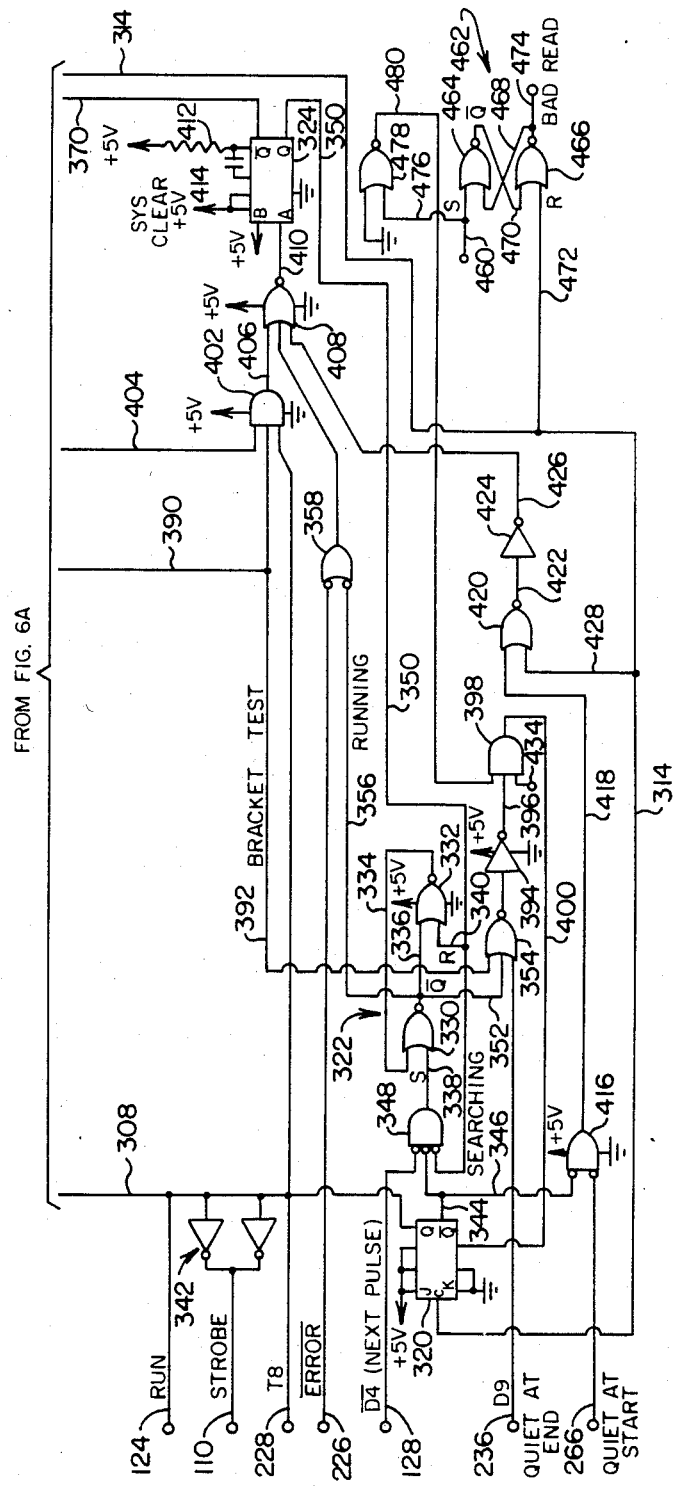

Looking to FIGS. 6A and 6B, the control circuit for reacting to the above information to develop or read a final output is revealed, the output lines and input lines described in conjuncton with FIG. 4 again being reproduced in these figures. Looking, in particular, to FIG. 6A, it may be observed that $\overline{DATA}$ at line 252, carrying 1-bit data is introduced to the B terminal of a first of a grouping of three series or cascade coupled 8-bit serial-in, parallel-out shift registers 280-282. Registers 280-282 may be provided, for example, as type 74LS164 marketed by Signetics Corporation which feature gated serial inputs and an asynchronous master reset. Serial data are entered through a two input AND gate synchronously with a low-to-high clock transition.

With this arrangement, the 1-bit of data at line 252 is clocked into the shift register by the S/R clock signal at line 246. These data are propagated across the registers 280-282, tested for the validity of the bracketing bits contained therein and then transferred via the parallel signal array repesented generally at 284 to the data inputs of a microcomputer function represented at block 286. Present, for example, as a type 8751 marketed by Intel Corp., microcomputer 286 includes all requisite memory and input and output port functions (4K byte program memory space; 32 I/O lines; two 16-bit timer/event counters; a 2-level interrupt structure; a full duplex serial channel; a Boolean processor; an on-chip oscillator and clock circuitry) and is seen to operate with an externally coupled 7.328 MHz clock network 288. The microcomputer includes a conventional R-C start-up network 290 coupled with the reset terminal thereof, network 290 also including a reset button feature as represented by switch 292. Data received from the microcomputer 286 from signal array 284 may be serially outputted from along line 294 which is directed to the input of a line driver 296 having an output at line 298 for connection with a conventional RS232 coupling. Line driver 296 may be provided, for example, as a type MC1488 marketed by Motorola, Inc. In similar fashion, serial data may be inputted to the microcomputer function 286 from an RS232 input at line 300 which is directed to a line receiver 302, the output of which is provided at line 304. Data also may be outputted through the use of four data ports, a strobe port and three address ports shown in general at line array 306. Data thus provided at these ports may be, for example, directed to a digital readout device or the like. In general, the microprocessor 286 responds to a command input carrying $\overline{\text{DATA READY}}$/RUN signals presented from along line 308 for purposes of respectively receiving the numerical data presented from line array 284 and indicating that a search mode is underway. Additionally, the microcomputer provides an output at line 310 which carries a SEARCH command which is inverted at inverter 312 and then presented at line 314. The latter command indicates that the microprocessor 286 is in condition for permitting the operation of the remaining components of the circuit to locate a bar code and read it.

In addition to the general approach described above by which the computer function 286 receives data extracted from the networks of FIG. 4, the overall control system serves to carry out a series of tests for the detection of error. These tests are used to increase the probability of extracting only valid code data from the input video signals. For example, in reading a code, two general categories of error may occur, to wit, an existing code might not be read (herein designated a type 1 error), or an erroneous read may occur (herein designated a type 2 error). The type 2 error occurs when a valid code is misread or when a non-existent code is read and is typically considered to be one which is potentially more dangerous than a type 1 error. Generally, a trade-off exists between type 1 and type 2 error where concentration on one type error is made. For the most part, the instant error detection approach has been designed to minimize type 2 errors while providing acceptable type 1 error levels.

In addition to the valid-bit timing detection formed by the bit sampler network 130, the error detection scheme will detect the following errors:

1. inadequate quiet zone after the end of code
2. inadequate quiet zone before the start of code
3. missing pulses in the code
4. incorrect start bits
5. incorrect stop bits
6. incorrect parity in the extracted code
7. incorrect number of bits in the code
8. illegal bit pattern in the code's extracted data bits
9. failure of the computer function 286
10. time-out occurring during the extraction procedure with no code being found When an error occurs, one of two procedures may be carried out by the control system: the ongoing extraction process is terminated and a new extraction process is initiated; or the extraction simply is terminated. Errors 1-7 cataloged above result in the termination and a re-initiation of the extraction process, while errors 8 and 9 result in termination of extraction.

The control approach to the reading system is one which not only determines the presence of any of the above enumerated errors but also establishes the boundaries of a code sequence of transitions with the earlier-noted QUIET AT THE START and QUIET AT THE END intervals. Generally, the definition of these various states of operation principally is provided by three state defining devices shown in FIG. 6B, a searching (searching mode) flip-flop 320 which may be provided, for example, as a type 74LS76; a running flip-flop (running mode) shown generally at 322; and an extraction re-initiation device 324 which may be provided as a type 74LS123 retriggerable mono-stable multivibrator. Flip-flop 322 may be observed to be comprised of discrete NOR gates 330 and 332 which are interconnected by lines 334 and 336 to provide an RS architecture such that the S terminal is at line 338, the $\overline{Q}$ terminal at line 336 and the R terminal at line 340.

The searching mode of operation is one wherein the system looks for a bar code by seeking transitions in the camera 26 output. This search commences with a pulsed output from the microcomputer 286 at line 310 (FIG. 6A) which is inverted at inverter 312 to be presented along line 314 as $\overline{\text{SEARCH}}$ to the clock input of flip-flop 320. This causes a logic high pulsed output to be provided at line 308 which serves to insert a corresponding RUN (search mode) signal to the microcomputer 286. Additionally, as represented at line 124 the RUN signal is introduced to multivibrator 118 in FIG. 4 to enable network 131 to receive a pulse train. Further, the signal at line 308 is inverted at dual inverters 342 to provide a STROBE signal at line 110 which has been described in connection with FIG. 3 as having a utility for carrying out the actuation of strobe unit 30.

Searching mode flip-flop 320 also serves to provide an inverted SEARCHING signal at its $\overline{Q}$ output at line 344. Line 344, in turn, is coupled with line 346 which extends to one input of an inverted input AND gate 348, the output of which at line 338 is the S terminal of running mode flip-flop 322. Gate 348 also receives a logic low input from line 350 which is coupled with the Q output of master restart monostable multivibrator 324. Flip-flop 322 will be triggered upon the occurrence of the signal $\overline{D4}$ at line 128 which is identified as a "NEXT PULSE" signal which, as described in connection with FIG. 4 is the $\overline{Q}$ output of multivibrator 118 and represents the first pulse which will be seen by network 131. Thus, upon the occurrence of the timing signal $\overline{D4}$, the running flip-flop 322 assumes a running mode or state. This running mode represents a condition wherein a potential code has been encountered and the procedures described in connection with FIG. 4 to extract or sample it are being carried out. The running signal which is developed at the flip-flop 322 $\overline{Q}$ terminal line 336 is provided as a logic low value which is seen to be directed by line 352 to one input of an inverted input AND gate 354 and via line 356 to inverted input AND gate 358.

When the collected data have been clocked into the shift registers 280-282, a "bracket" test is carried out to determine its validity. Referring to FIG. 6A, this bracket check is implemented by a multiple input NAND gate 360. Gate 360 receives one input at line 362 from the $\overline{Q}$ output of a JK flip-flop 364 which may be provided, for example as a type 74LS76. The clock input of flip-flop 364 receives the output of the parity counter (FIG. 4) at line 256 which is inverted by inverter 366 for presentation to the flip-flop along line 368. The flip-flop 364 provides a modulo two parity output at line 362 and is reset at its RD terminal from line 370 which is coupled, in turn, to the $\overline{Q}$ of master restart multivibrator 324 (FIG. 6B). The output at line 362, where an even number of 1-bits occur, will be a logic high.

Should the bit sequence applied to the shift registers 280-282 exceed the selected proper number of bits, then a bit will be identified at line 372 extending thereto which is inverted at inverter 374 and asserted at gate 360 from line 376. Normally, the output at line 372 will be a logic low which is inverted to provide a normal condition logic high at line 376. Similarly, the start bits of the code are examined which, for the instant embodiment, are seen to require the presence of 1-bits at the three initial locations as are monitored by lines 378–380. In similar fashion, the stop bits are monitored at shift register 280, the ending sequence shown being required to be a 0-1-1 as will be monitored by respective lines 382–384. Note that the 0-bit which should be present at line 382 for a valid bracket determination is inverted by inverter 386 and the inverted signal is asserted at gate 360 from line 388.

In the event that the bracket test indicates that a valid code has been received, a logic low signal will be derived at the output of gate 360, line 390 which, as seen in FIG. 6B extends via line 392 to one input of inverted input AND gate 354. Gate 354 receives this bracket test input in addition to the running mode signal at line 352 from flip-flop 322 and, finally, the QUIET AT END signal input D9 from line 236. Thus, at such time in the timing sequence from network 130 that the QUIET AT END interval (for example 1.2 microseconds) ending signal is received, then the output of gate 354 transitions to a logic high which is inverted at inverter 394 and directed along line 396 to one input of inverted-input, inverted-output OR function gate 398. The output of gate 398 is directed along line 400 to the reset input of searching mode flip-flop 320. This input causes the RUN signal at line 308 to transition to a logic low and thus provide a $\overline{\text{DATA READY}}$ signal which instructs the microcomputer 286 to read the data at line array 284. Note that the extraction re-initiation multivibrator 324 has not been actuated at this time, but such actuation will occur (in the absence of error) following the presentation of a new SEARCH request by microcomputer 286 as described later herein.

In the event that the bracket test carried out at gate 360 shows that an invalid code has been received, then the output at line 390 is a logic high which is received at one input of AND function gate 402. Gate 402 additionally receives an input from line 404 which extends to line 378 serving to monitor the last bit of the data sequence presented at shift register 282. Thus, the condition that the entire code be inserted before corrective procedures can take place is provided. Gate 402 is actuated upon the occurrence of a time T8 pulse, as is presented from line 228 as described in FIG. 4. A resultant bracket error signal representing a logic high pulse then is developed at output line 406 and asserted at one input of an OR function gate 408. The resultant ouput of gate 408 at line 410 is a negative going transition which is directed to the A terminal of master restart multivibrator 324. As a consequence of this input, a pulse is developed at the $\overline{Q}$ output of multivibrator 324 at line 370 which carries out the clearing not only of the parity counter 364 but also each of the shift registers 280–282. The pulse width of the outputs of the multivibrator 324 are determined by selection of the values of capacitance and resistance at resistor 412 and capacitor 414. Simultaneously, the inverted output of the Q terminal of multivibrator 324 at line 350 is directed to line 340, the reset input to flip-flop 322 to terminate the running mode state thereof. This causes a signal transition at line 352 which is propagated in conjunction with signal D9 through gates 354, 394, and 398 to present a resetting of the search flip-flop 20 from line 400, thus the searching mode. As is indicated by the interaction of the running flip-flop 322 and the search flip-flop 320, the system continually looks for data (searching mode) and enters the running mode when data extraction starts. It then resets to the search mode when invalid data is determined.

At the termination of a valid read, and the acceptance of the data at line array 284 by the microcomputer 286, the system will be reset by multivibrator 324. However, it is essential that the shift registers not be cleared until the reading of valid data has been completed. Thus, the requisite timing for final clearing of the system is created by a searching mode condition at line 346 and the occurrence of the QUIET AT START time-out as developed in conjunction with the network shown in FIG. 4 and presented at line 266. These inputs are provided at inverted input AND function gate 416, the system RESET signal output thereof being submitted along line 418 to one input of OR function gate 420. The resultant output from gate 420 is directed along line 422 to an inverter stage at line 424 and the resultant inverted output at line 426 is directed to one input of OR function gate 408 to carry out a master resetting of the system at the QUIET AT START time-out. Note additionally, that the search signal at line 314 also is directed to one input of OR function gate 420 through line 428. Thus, the shift registers are cleared and the system is reset upon the occasion of an initial search command from the microcomputer 286.

The extraction re-initiation multivibrator also resets the system upon the occasion of an error determined in the course of code extraction as described in conjunction with FIG. 4 at line 226. This signal is ANDed with the running mode output signal at line 356. Accordingly, a sampling error will not be recognized unless the system is in a running mode.

Another condition by which the searching or running mode may be terminated resides in a monitoring of the cyclic performance of the program of microcomputer 286. This program will produce a sequentially occurring pulse at about a 1 millisecond rate. The pulse is outputted from along line 430 to the A input of a retriggerable mono-stable multivibrator 432 which may be provided as a type 74LS123. This form of a network and programm interaction is termed a "watching timer". The resistor-capacitor network pulse timing components 435 externally connected to multivibrator 432 are selected having electrical values sufficient to derive a pulse width which will provide a continuous logic high output at the Q output thereof at line 434. Should the pulse output diminish, then the signal at line 434 will revert to a logic low. This signal is witnessed along line 436 and inverted by inverter 438 to effect the turning on of a an LED 440, the anode of which is coupled to +5 V. Line 434 also is coupled to one input of OR gate 398 (FIG. 6B). Accordingly, with the outputting of an error signal at line 434, the search mode is reset along with the running mode. In effect, a form of self test is achieved. The self-testing output from the microcomputer 286 also is provided along line 442 which is directed to the phototransistor of a phototransistor optoisolator 444 which may be utilized to provide an output to peripheral control equipment, for example any form of programmable controller which may operate with the reading system. This same form of programmable controller may also be utilized to initiate a read sequence, for example through phototransistor optoisolator 446. In this regard, the optoisolator 446 is reversed in its operation to receive a signal through its phototransistor which is conveyed via line 448 to an appropriate read command input of microcomputer 286. In similar fashion, the termination of a read may be indicated by the microcomputer 286 which provides a READ DONE signal at the termination of reading along line 450 which signal is inverted at inverter 452 and asserted along line 454 to phototransistor optoisolator 456.

The microcomputer 286 also maintains an internal clock which serves to limit the time within which a code is to be extracted. If no code is extracted within that interval, for example 10 seconds, then the extraction process is halted through the generation of an error condition. This output error condition is manifested by a positive-going pulse at output line 460 extending from microcomputer 286. Line 460 is coupled and again represented in FIG. 6B as leading into one input of an RS flip-flop shown generally at 462 and structured as an association of two NOR gates 464 and 466 which are interconnected by lines 468 and 470. With this arrangement, the S terminal input to the flip-flop 462 is provided at line 460, the R terminal at line 472, the Q output at line 474 and the $\bar{Q}$ output at line 470. With the arrangement shown, the assertion of a positive going bad read or error pulse at line 460 will be asserted along line 476 to NOR gate 478, and the resultant logic low output thereof at line 480 will be asserted to one input of OR function gate 398 to cause the termination of the search. Additionally, a corresponding positive-going bad read pulse will be simultaneously created at line 474 which is directed to a bad read indication network 482 (FIG. 6A). Line 474 is reproduced in the latter figure as being directed through an inverter stage 484 which selectively illuminates an LED 486 on the occasion of a bad read. Additionally, the output of inverter 484 is coupled via line 488 to an inverter 490 wherein the output signal thereof is presented along line 492 to the light emnitting diode of a phototransistor optoisolator 494. Thus, the bad read signal may be directed to a programmable controller or like peripheral equipment. Optoisolators 444, 446, 456 and 494 may be provided, for example, as type 4N36 phototransistor optoisolators marketed by Monsanto Corporation.

Figure 7A:
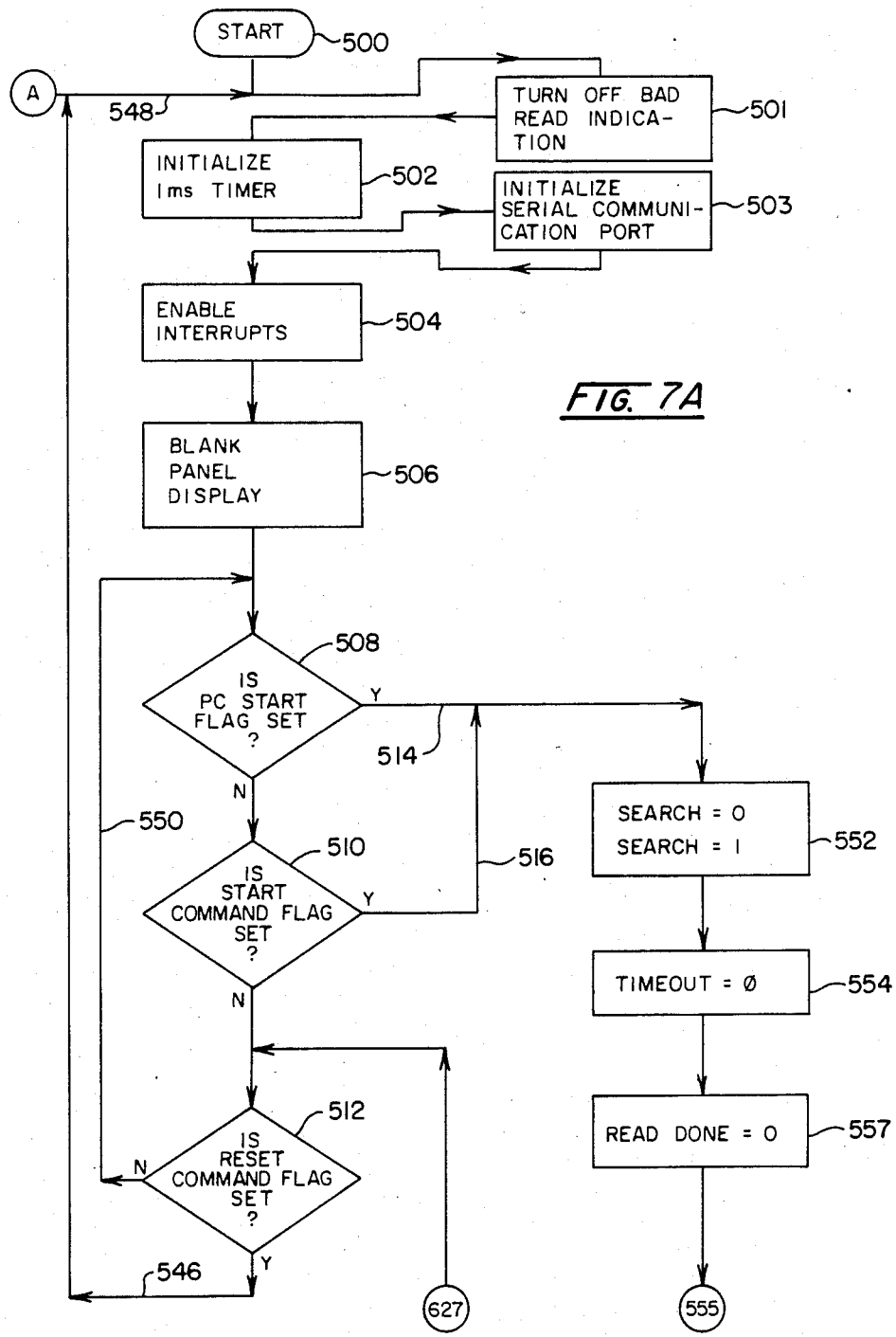
FIGS. 7A and 7B combine to provide a flow chart of the main program by which the microcomputer shown in FIG. 6A performs.
Figure 7B:
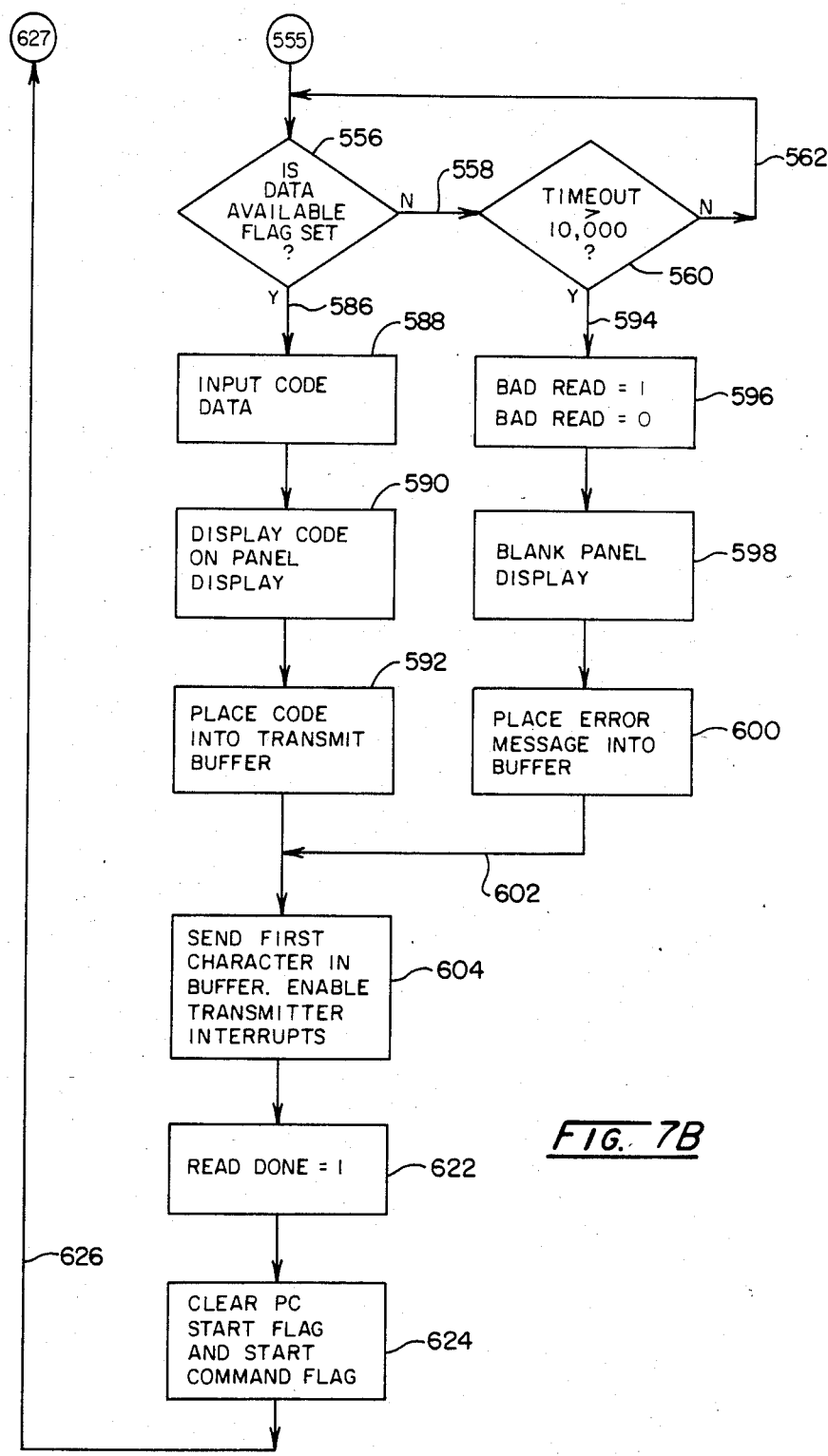

The control program by which microcomputer 286 performs is one which essentially responds to the generation of interrupts which are occasioned by the development of searching and running and restarting the system, as well as by the assertion of commands from peripheral devices such as programmed controllers or host computers. Referring to FIGS. 7A and 7B, the main program with which these interrupt programs are associated is revealed in flow diagrammatic fashion. Looking to FIG. 7A, the program is seen to commence at start node 500, where it progresses to the instructions at block 501 serving to turn off a BAD READ indication. The program then continues to block 502 providing for the initialization of a 1 millisecond timer. This timing function will be seen to be carried out by an internal timer to the microcomputer 286 and is utilized in conjunction with the watchdog mono-stable multivibrator 432 (FIG. 6A). Initialization of the serial communication port then occurs as represented by block 503. This procedure sets up baud rate and communication characteristics. The program then proceeds, as represented at block 504, to enable all of the interrupts with which it cooperates. Then, as revealed at block 506, a panel display (not shown) which may be utilized with the system is blanked. It may be recalled in conjunction with the discussion of FIG. 6A, that line array 306 provides binary coded decimal (BCD) information on four leads of the array represented decoded information, while three of the leads may provide address information and all of this information may be strobed into a digital display panel for providing a code read output by the final lead of the grouping. By interpreting one character as a blank command, initialization of such devices may be carried out.

The program then commences to investigate the status of any of a number of flags. For the instant description, three of those inquiries are shown at blocks 508, 510, and 512. The inquiry at block 508 determines whether or not the programmable controller or other peripheral device start flag has been set. This flag will have been set by an interrupt occasioned at any time by the imposition of a signal into optoisolator 446 which directs a read signal along line 448 to the microcomputer 286 (FIG. 6A9. Thus, in the event of an affirmative determination, as represented at lines 514 and 516, the program commences to enter a searching mode.

Looking momentarily to FIG. 8, the programmable controller start interrupt routine is revealed as commencing with node 518 and functions as represented at block 520 to set a PC start flag, whereupon as represented at node 222, a return from the interrupt program is made.

Returning to FIG. 7A, in the event of a negative determination with respect to block 508, the program proceeds to determine whether a start command flag has been set, as represented at inquiry block 510. In the event of an affirmative response, then as represented at line 516, the system enters a searching mode. In the event the inquiry at block 510 determines that the start command flag has not been set, then as revealed at block 512, the inquiry is made as to whether a rest command flag has been set. The principal source for receipt of a start command or a reset command will be from a host computer or similar device which will convey such commands from along line 300 as a serial input to microcomputer 286. This interrupt routine is revealed in FIG. 9.

Looking momentarily to FIG. 9, the receiver interrupt routine is shown commencing at node 524 and initially inquiring as to whether the received character is an "S", as depicted by block 526. In this regard, the "S" character will represent a start command. Accordingly, with an affirmative determination of that character, as represented at line 528 and block 530, a command is provided to set the start command flag. The interrupt program then returns to the main program as depicted by lines 532, 534, and node 536.

Where the inquiry posed at block 526 results in a negative determination, then as represented by block 538, the inquiry is made to whether the received character is an "R". For this embodiment, the character "R" represents a reset command and in the event of an affirmative determination, as represented at line 540 and block 542, the reset command flag is set and as shown by lines 544, 534, and node 536, the interrupt program returns to the main program.

Returning to FIG. 7A, where the reset command flag has been set as determined by the inquiry at block 512, then as represented at line 546 and line 548 the main program returns to start at node 500 and carries out the above discussed initialization and inquiry procedures. Where the inquiry at block 512 indicates that no reset command has been sent, then as represented by loop line 550, the program awaits some form of start or reset command.

Returning to blocks 508 and 510, with the receipt of some form of start command, as represented at line 516, the program then proceeds to the command at block 552. This command provides for setting the search output of the microcomputer 286 at 0 and then 1 to thus evolve a pulsing or strobing at line 310 (FIG. 6A) which, as described above, sets the searching flip-flop 320. Once this flip-flop is set, code will be extracted and the searching mode will be maintained until a code is detected whereupon it is reset, indicating that the code has been found. Additionally, an internal time-out counter is set to 0 as represented at block 554 which will be seen to provide a period of time, for example, about 10 seconds during which the searching mode is permitted to continue. The READ DONE flag is set to 0 as represented by block 557.

As represented by connector 555, the program then proceeds to the inquiry at block 556 in FIG. 7B wherein a determination is made as to whether the DATA AVAILABLE flag has been set. This flag will be set upon the resetting of searching mode flip-flop 320 and the development of the resulting transition at line 308 representing a $\overline{\text{DATA READY}}$ input to microcomputer 286. Where the data available flag has not been set, then as represented at line 558 and inquiry block 560, a determination is made as to whether the value of the time-out counter is greater than or equal to 10,000, i.e. 10 seconds. Where that value has not been reached by the counter, then as represented by loop line 562, the program dwells until the data available flag is provided or time-out occurs.

Figure 11:
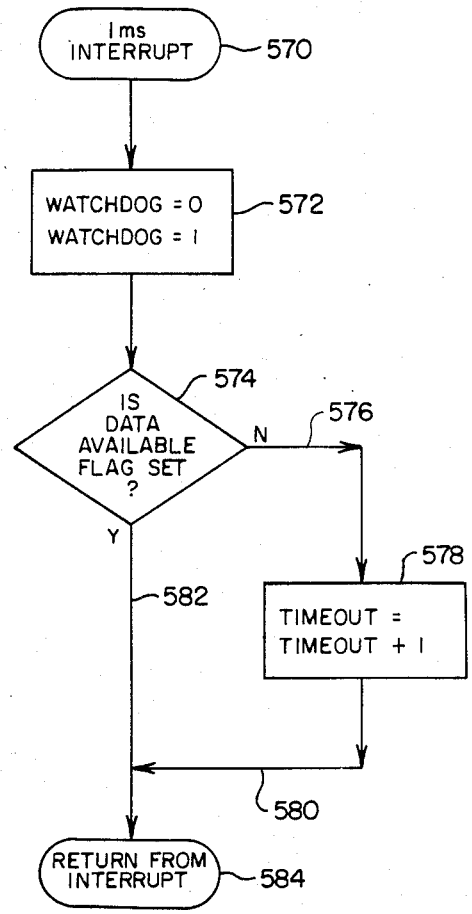
FIG. 11 is a flow chart for a 1 millisecond interrupt routine.

Referring momentarily to FIG. 10, the DATA READY interrupt routine is revealed. Looking to the figure, the interrupt routine commences at node 564 and proceeds to set the DATA AVAILABLE flag as represented at block 566. The interrupt program then returns to the main program. Looking additionally to FIG. 11, the 1 millisecond interrupt program is revealed. This program commences with node 570 and then proceeds as represented at block 572 to set the watchdog output at line 430 (FIG. 6A) first to 6 and then to 1 to provide a pulse or strobe output at line 430. Because the value of components in network 435 are selected as greater than 1 millisecond, the output of multivibrator 432 at line 434 will remain at a logic high or active while the interrupts are occurring in regular fashion. When this routine does not execute, then a self test failure indication is developed along with an unasserted OK output or provided by optoisolator 444 of FIG. 6A. This device also will indicate these two problem modes upon the occurrence of a power failure.

The 1 millisecond interrupt routine then proceeds to the inquiry at block 574 to determine whether the DATA AVAILABLE flag has been set. In the event that it has not, then as represented by line 576 and block 578, the time-out counter is incremented by 1 and, as represented at lines 580, 582 and node 584, the main program is reaccessed. Where the inquiry at block 574 results in an affirmative determination, as represented by line 582 and node 584, the main program is reaccessed.

Returning to FIG. 7B, in the event that the DATA AVAILABLE flag has been set and data have been acquired, then as represented by line 586 and block 588, the microcomputer 286 reads the data which is available from the shift registers 280–282 at line array 284 (FIG. 6A), i.e. the code data is inputted. The program then proceeds to the command at block 590 at which location, a command is provided to display the code so received at a display panel or the like which may be driven from line array 306 (FIG. 6A). The program then proceeds to the instructions at block 592, wherein the same code is placed into a transmit buffer of microcomputer 286. This buffer will be utilized to transmit the received code serially from line 294 and through driver 296 to an RS232 form of connection.

Where inquiry at block 556 indicates that the DATA AVAILABLE flag has not been set and the time-out has exceeded 10 seconds as represented at block 560, the program proceeds as represented by line 594 to the instructions at block 596. With this instruction, the output of microcomputer 286 at line 460 is transitioned from 1 to 0 to provide a strobe or pulse which is utilized as described in conjunction with FIG. 6B to generate a BAD READ signal at line 474 which is utilized to illuminate LED 486 and to provide a BAD READ output to programmable controllers or the like through optoisolator 494 (FIG. 6A). This signal at line 460 additionally is utilized for the purpose of resetting the searching mode flip-flop 320 from line 480 (FIG. 6B). The program then proceeds to the instructions at block 598 wherein the display panel which may be driven from line array 306 is blanked, whereupon, as represented at block 600, an error message is placed in a buffer and, as shown by line 602, the program then proceeds to the instructions at block 604. At this juncture in the program, either a code will have been placed in the transmit buffer, or an error message will be so positioned. The command at block 604 provides for sending the first character in the buffer and for enabling the transmitter interrupts. This is a conventional technique for preparing to transmit data in serial fashion.

Figure 12:
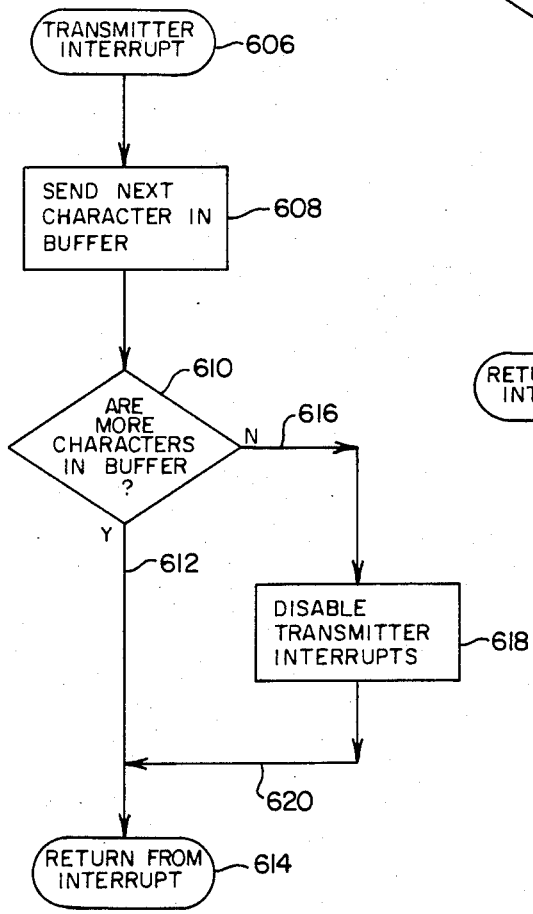
FIG. 12 is a flow chart for a transmitter interrupt routine.

Referring momentarily to FIG. 12, the transmit interrupt routine (generated internally within microcomputer 286) causes the microcomputer 286 to execute an interrupt service routine which is revealed as commencing with node 606 and progresses to the instruction at block 608 providing for the sending of the next character in the transmit buffer. Upon the sending of the next character, the interrupt routine inquires as to whether any characters remain in the buffer. In the event that characters do remain in the buffer, then as represented by line 612 and node 614, a return is made to the main program. Where the inquiry at block 610 results in a negative determination wherein no more characters are found to remain in the transmit buffer, then as represented by line 616 and block 618, the internally generated transmitter interrupts are disabled. The program then returns as represented by lines 620, 612 and node 614 to the main program.

Returning to FIG. 7B, the program continues with the instruction at block 622 wherein the READ DONE output is set to a 1 or logic high. It may be recalled that this signal is provided by the microcomputer 286 at line 450 which provides an output for programmable controller or peripheral devices through optoisolator 456. The program then proceeds to the instructions at block 624 which provide for the clearing of the start flag detected at block 508, as well as a start command flag as detected at block 510. The program then returns to the initial loop as represented by line 626 and node 627 to input to block 512 (FIG. 7A).

Figure 13:
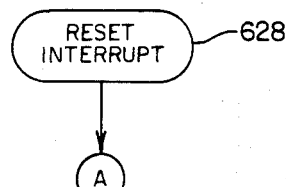
FIG. 13 is a flow chart for a reset interrupt routine.

FIG. 13 shows the reset interrupt routine as developed at node 628 and immediately returning the program to node A which is shown in FIG. 7A as being directed to line 548 to commence the program at its start with initialization procedures and the like. This reset, for example, may be generated not only internally but in conjunction with the actuation of the reset switch within the start-up network 292.

Since certain changes may be made in the above system, method and apparatus without departing from the scope of the invention herein involved, it is intended that all matter contained in the above description or shown in the accompanying drawings shall be interpreted as illustrative and not in a limiting sense.

What is claimed is:

1. Apparatus for reading a code provided as a word deriving sequence of radiation definable transitions carried on an object and selectively spaced from said first to last in accordance with a predetermined ratio defining first-bit and second-bit information, comprising:

imaging means for imaging at least a portion of said code carrying object for generating an imaged output signal having image signal transitions occurring in a time spaced sequence corresponding with said code sequence of spaced transitions;

signal treatment means responsive to said imaging means for converting said image signal transition into a corresponding train of pulses;

sequencer means for receiving said train of pulses and having a sequence of timing stages positioned from first to last for selectively delaying the transmission of said pulses therethrough to establish a sequence of pulse occurrence timing signals commencing with said train of pulses;

first sampling network means responsive to a given said timing signal established in conjunction with a sampling said timing stage positioned subsequent in said sequence from said first stage for deriving a valid first-bit condition following a first interval corresponding with a said time spaced sequence representing said first-bit select spacing and responsive to a next said timing signal occurring during said valid first-bit condition established at a next pulse said timing stage position prior in said sequence to said sampling timing stage to provide a first-bit datum;

second sampling network means responsive simultaneously with said first sampling network means to said given timing signal for deriving a valid second-bit condition following a second interval corresponding with a said time spaced sequence representing said second-bit select spacing and responsive to said next timing signal occurring during said valid second-bit condition established by said next pulse timing stage to provide a second bit datum;

serial-to-parallel alignment means responsive to each said first-bit datum and said second-bit datum in the sequence of their occurrence for deriving a serial alignment corresponding therewith defining a word and having a parallel output corresponding therewith representing said word; and control means responsive to said parallel output for carrying out the decoding thereof.

2. The apparatus of claim 1 in which said sequencer means includes sequence monitoring stage means responsive to the initial one of said pulse occurrence timing signals of said last timing stage commencing a word defining sequence thereof to derive a datum representing the initial one in said sequence of occurrence.

3. The apparatus of claim 2 in which:

said control means includes restart means responsive to a restart signal for clearing said serial-to-parallel alignment means; and including error detect means responsive to the occurrence of a said next timing signal in the simultaneous absence of said valid first-bit condition and said valid second-bit condition for effecting the derivation of said restart signal.

4. The apparatus of claim 1 in which said signal treatment means includes means for differentiating said imaged signal transitions to derive differentiated transitions and means for converting said differentiated transitions to said train of pulses.

5. The apparatus of claim 1 in which:

said first sampling network comprises:

first monostable multivibrator means for receiving said given timing signal subsequent to being cleared and responsive to have a first output following said first interval, first tolerance monostable multivibrator means responsive to said first output, subsequent to being cleared, for deriving said valid first-bit condition for a predetermined first tolerance interval, and first latch means responsive, subsequent to being cleared, to said next timing signal in the presence of said valid first-bit condition for providing said first-bit datum; and said second sampling network comprises:

second monostable multivibrator means for receiving said given timing signal subsequent to being cleared and responsive to have a second output following said second interval, second tolerance monostable multivibrator means responsive to said second output subsequent to being cleared for deriving said valid second-bit condition for a predetermined second tolerance interval, and second latch means responsive, subsequent to being cleared, to said next timing signal in the presence of said valid second-bit condition for providing said second-bit datum.

6. The apparatus of claim 5 in which:

said sampling timing stage is the last of said sequence thereof;

said first and second latch means are cleared upon the occurrence of said given timing signal;

said first and second tolerance monostable multivibrator means are cleared upon the occurrence of a timing signal provided by a said timing stage positioned in said sequence subsequent to said first stage;

said first and second monostable multivibrator means are cleared upon the occurrence of a timing signal of a said timing stage positioned in said sequence subsequent to said first stage and prior to said timing stage providing said timing signal clearing said first and second tolerance monostable multivibrators; and said next timing signal is provided upon the occurrence of a pulse input to said first timing stage.

7. The apparatus of claim 5 in which:

said control means includes restart means responsive to a restart signal for clearing said serial-to-parallel alignment means;

legal output means coupled with said first and second latch means and responsive to the presence of a datum output thereof to derive a legal bit status condition and having an illegal bit status condition in the absence of a said datum output;

error status means responsive, subsequent to being cleared, to said illegal bit status condition and to the occurrence of a timing signal provided by a said timing stage positioned in said sequence subsequent to said first stage and prior to said last stage for deriving said restart signal.

8. The apparatus of claim 7 in which:

said sampling timing stage is the last of said sequence thereof;

said first and second latch means and said error status means are cleared upon the occurrence of said given timing signal;

said first and second tolerance monostable multivibrator means are cleared upon the occurrence of a timing signal provided by a said timing stage positioned in said sequence subsequent to said first stage;

said first and second monostable multivibrator means are cleared upon the occurrence off a timing signal of a said timing stage positioned in said sequence subsequent to said first stage and prior to said timing stage providing said timing signal clearing said first and second tolerance monostable multivibrators; and said next timing signal is provided upon the occurrence of a pulse input to said first timing stage.

9. The apparatus of claim 1 in which:

said sequencer means includes retriggerable sequence monitoring means responsive to each said timing signal derived from said last timing stage for commencing the timing of a predetermined interval selected as greater than the pulse interval of said pulse occurrence sequence and having a quiet at the end condition upon the occurrence of said timeout;

said control means includes:

computer means coupled with said serial-to-parallel alignment means parallel output for reading said output in response to a data ready signal and for providing a search signal;

bracket test gate means for evaluating said bit datum at select positions of said parallel output with respect to predetermined check values thereof to derive a bracked test output in the presence of correspondence therebetween and bracket error condition in the absence of such correspondence;

search mode status means responsive to said search signal to derive a search mode condition;

running mode status means responsive to said bracket test output, said search condition and the occurrence of a said timing signal to derive a running mode condition and responsive to said running mode condition, said quiet at the end condition for effecting derivation of said data ready signal.

10. The apparatus of claim 9 in which:

said sequencer means includes start timer means responsive to said quiet at the end condition for commencing the timing of a predetermined interval and deriving a quiet at the start condition at the conclusion of said time-out;

said control means includes restart means responsive to a restart signal for clearing said serial-to-parallel alignment means, and means responsive to said quiet at the start condition in the presence of said running mode condition to derive said restart signal.

11. The apparatus of claim 10 in which said control means includes means for deriving said restart signal in response to said bracket error condition.

12. The apparatus of claim 9 including means for enabling said sequencer means in response to said search mode condition.

13. A system for reading a code at the surface of an object provided as a word deriving sequence of three-dimensional code components selectively spaced from first to last in a spacing ratio defining first-bit and second-bit information, comprising:

radiation source means for exposing said surface to radiation from a location deriving radiation definable transitions at said code components;

imaging means for imaging said surface to generate a video type output signal having transitions occurring in a time spaced sequence corresponding with said code component spacing;

signal treatment means responsive to said imaging means for differentiating the said transition thereof and converting said differentiated transition to a corresponding train of pulses;

sequencer means for receiving said train of pulses and having a sequence of timing stages from first to last for selectively delaying the transmission of said pulses therethrough to establish a sequence of pulse occurrence timing signals;

a sampling circuit including:

first sampling network means having a first tansition interval timing stage responsive to a given said timing signal established with respect to a sampling said timing stage positioned subsequent in said sequence from said first stage, or providing a first output following an interval corresponding with a said time spaced sequence representing said first-bit select spacing, a first tolerance interval timing stage responsive to said first output for deriving a valid first-bit condition for a predetermined first tolerance interval, first latch means responsive to a next said timing signal occurring during said valid first-bit condition corresponding with a next pulse said timing stage position located prior in said sequence to said sampling timing stage to provide a first-bit datum, and second sampling network means having a second transition interval timing stage responsive to said given timing signal for providing a second output following an interval corresponding with a said time spaced sequence representing said second-bit select spacing, a second tolerance interval timing stage responsive to said second output for deriving a valid second-bit condition for a predetermined second tolerance interval, and second latch means responsive to said next timing signal occurring during said valid bit condition to provide a second bit datum;

serial-to-parallel alignment means responsive to each said first-bit datum and said second-bit datum in the sequence of their occurrence for deriving a parallel output representing a said word; and control means responsive to treat said parallel output.

14. The system of claim 13 in which:

said radiation source is a strobe light actuable to provide illumination along a given axis of light propagation; and said imaging means is a video signal generating device having entrance optics the control axis of which is aligned substantially normal to said given axis.

15. The system of claim 14 in which said strobe light is actuated substantially in synchronism with the field rate of said video signal.

16. The system of claim 13 in which said sequencer means includes sequence monitoring stage means responsive to the initial one of said pulse occurrence timing signals of said last timing stage commencing a word defining sequence thereof to derive a datum representing the initial one in said sequence of occurrence.

17. The system of claim 13 in which:
said control means includes restart means responsive to a restart signal for clearing said serial-to-parallel alignment means; and
said sampling circuit includes error detect means responsive to the occurrence of a said next timing signal in the simultaneous absence of said valid first-bit condition and said valid second-bit condition for effecting the derivation of said restart signal.

18. The system of claim 13 in which:
said control means includes restart means responsive to a restart signal for clearing said serial-to-parallel alignment means;
said sampling circuit includes legal output means coupled with said first and second latch means and responsive to the presence of a datum output thereof to derive a legal bit status condition and having an illegal bit status condition in the absence of a said datum output;
error status means responsive, subsequent to being cleared, to said illegal bit status condition and to the occurrence of a timing signal provided by a said timing stage positioned in aid sequence subsequent to said first stage and prior to said last stage for deriving said restart signal.

19. The apparatus of claim 13 in which:
said sequencer means includes retriggerable sequence monitoring means responsive to each said timing signal derived from said last timing stage for commencing the timing of a predetermined interval selected as greater than the pulse interval of said pulse occurrence sequence and having a quiet at the end condition upon the occurrence of said time-out;
said control means includes:
computer means coupled with said serial-to-parallel alignment means parallel output for reading said output in response to a data ready signal and for providing a search signal;
bracket test gate means for evaluating said bit datum at select positions of said parallel output with respect to predetermined check values thereof to derive a bracked test output in the presence of correspondence therebetween and bracket error condition in the absence of such correspondence;
search mode status means responsive to said search signal to derive a search mode condition;
running mode status means responsive to said bracket test output, said search condition and the occurrence of a said timing signal to derive a running mode condition and responsive in said running mode condition, said quiet at the end condition for effecting derivation of said data ready signal.

20. The apparatus of claim 19 in which:
said sequencer means includes start timer means responsive to said quiet at the end condition for commencing the timing of a predetermined interval and deriving a quiet at the start condition at the conclusion of said time-out;
said control means includes restart means responsive to a restart signal for clearing said serial-to-parallel alignment means, and means responsive to said quiet at the start condition in the presence of said running mode condition to erive said restart signal.

21. The method for reading a code at the surface of an object provided as a word deriving sequence of radiation definable transitions selectively spaced in accordance with a predetermined ratio defining first-bit and second-bit information comprising the steps of:
imaging said surface with a video device to generate an output signal having transitions occurring in a time spaced sequence corresponding with said code sequence of spaced transitions;
forming a train of pulses from said output signal transitions;
applying said train of pulses to a sequence of timing stages from first to a sampling stage to establish a sequence of pulse occurrence timing signals;
applying a given timing signal associated with said sampling stage to a first sampling network having a valid first-bit condition during a first tolerance interval following a first interval corresponding with a said time spaced sequence representing said first-bit select spacing;
simultaneously applying said given timing signal to a second sampling network having a valid second-bit condition during a second tolerance interval following a second interval corresponding with a said time spaced sequence representing said second bit spacing;
deriving a first-bit datum when the next pulse of said train of pulses following said given timing signal occurs during said first tolerance interval;
deriving a second-bit datum when the said next pulse occurs during said second tolerance interval;
arranging each said derived first-bit datum and said second-bit datum serially in the sequence of their occurence to develop a said word; and
reading said word.

22. The method of claim 21 including the steps of:
differentiating said output signal transitions to provide differentiated transition signals; and
forming said train of pulses from said differentiated transition signals.

23. The method of claim 21 including the step of indicating the presence of a said first-bit datum upon the occurrence of the first said given timing signal developed from a word defining sequence of said train of pulses.

24. The method of claim 21 including the steps of generating an error signal when said first-bit datum or said second-bit datum are not derived upon the occurrence of said next pulse; and
cancelling said arrangement of said first-bit datum and said second-bit datum in response to said error signal.

25. The method of claim 21 including the step of providing a quiescent interval of predetermined length upon the completion of propagation of a word defining sequence of said train of pulses through said timing stages.

26. The method of claim 21 including the step of illuminating said surface with a source of light having an axis of light propagation arranged at an angle with respect to said surface to derive said transitions as light-to-shadow transitions.

* * * * *